(12) United States Patent
Bulgrin

(10) Patent No.: US 7,031,800 B2
(45) Date of Patent: Apr. 18, 2006

(54) OO CONTROL FOR INJECTION MOLDING MACHINE

(75) Inventor: Thomas C. Bulgrin, Columbia Station, OH (US)

(73) Assignee: Van Dorn DeMag Corporation, Strongsville, OH (US)

( * ) Notice: Subject to any disclaimer, the term of this patent is extended or adjusted under 35 U.S.C. 154(b) by 99 days.

(21) Appl. No.: 10/254,245

(22) Filed: Sep. 25, 2002

(65) Prior Publication Data

US 2003/0090018 A1 May 15, 2003

Related U.S. Application Data

(63) Continuation-in-part of application No. 09/968,357, filed on Sep. 29, 2001, now Pat. No. 6,695,994, and a continuation-in-part of application No. 09/967,731, filed on Sep. 29, 2001, now Pat. No. 6,682,669.

(60) Provisional application No. 60/326,069, filed on Sep. 29, 2001.

(51) Int. Cl.
   *G05B 19/04* (2006.01)

(52) U.S. Cl. ............. 700/200; 700/159; 264/40.5
(58) Field of Classification Search ............. 700/80, 700/83, 200, 90, 159; 705/8; 702/84, 183; 264/40–5, 134, 136
   See application file for complete search history.

(56) References Cited

U.S. PATENT DOCUMENTS 5,062,052 A  10/1991  Sparer et al.

(Continued)

OTHER PUBLICATIONS

Bruce Powel Douglas, "Real—Time UML", (Book), 1998, pp. 1-49, Addison Wesley Longman, Inc. USA.

(Continued)

*Primary Examiner*—Kidest Bahta
(74) *Attorney, Agent, or Firm*—Fay, Sharpe, Fagan, Minnich & Mckee, LLP

(57) ABSTRACT

A plastic injection molding machine has an object oriented programmed routine to control the molding cycle of the machine. The programmed routine implements the interrelated molding cycle of clamp, inject, hold, eject and recover by development of classes corresponding to machine structure performing basic molding cycle steps. The basic classes use object oriented concepts of data encapsulation, inheritance, polymorphism, abstraction and the like that are linked together to produce objects during run time. The classes in turn include controller, observer and actuators classes. The controller class functions as a state machine. The observer class functions to determine the current state and the actuator class produces command signals controlling class related machine hardware. A modeling system is also disclosed for constructing the OO programmed routine for any injection molding machine using existing classes, principally by difference.

32 Claims, 14 Drawing Sheets

U.S. PATENT DOCUMENTS

| | | |
|---|---|---|
| 5,456,870 A | 10/1995 | Bulgrin |
| 5,513,115 A | 4/1996 | Richards et al. |
| 5,997,778 A | 12/1999 | Bulgrin |
| 6,089,849 A | 7/2000 | Bulgrin et al. |
| 6,556,950 B1 * | 4/2003 | Schwenke et al. .......... 702/183 |
| 6,558,590 B1 * | 5/2003 | Stewart ..................... 264/40.5 |

OTHER PUBLICATIONS

Not Prior Art but attached is U.S. Appl. No. 60/326,069 which is provisional application on which priority is based.

Not Prior Art but attached is U.S. Appl. No. 60/326,069 which is claimed as parent aplication of subject application which is a C-I-P thereof.

Not Prior Art but attached is U.S. Appl. No. 60/326,069 which is claimed as parent application of subject application which is a C-I-P thereof.

* cited by examiner

OO CONTROL FOR INJECTION MOLDING MACHINE

CROSS REFERENCE TO PATENT APPLICATION(S) UNDER 35 USC §119, 120

This application claims the benefit of Provisional Application No. 60/326,069 filed Sep. 29, 2001 entitled "OO Control for Injection Molding Machine."

This invention is also a continuation-in-part of non-provisional application Ser. No. 09/967,731 filed Sep. 29, 2001 now U.S. Pat. No. 6,682,669 entitled "Model Predictive Control Apparatus and Methods for Motion and/or Pressure Control of Injection Molding Machines" and a continuation-in-part of non-provisional patent application Ser. No. 09/968,357 filed Sep. 29, 2001, now U.S. Pat. No. 6,695,994 entitled "Melt Pressure Observer for Electric Injection Molding Machine."

This invention relates to injection molding machines and more particularly to an object-oriented control system for injection molding machines.

This patent application incorporates by reference and makes a part hereof my non-provisional patent applications listed above. Specifically the details of the melt pressure observer and model predictive control law that set forth the algorithms and the control structure and implementation thereof are also utilized in the preferred implementation of the subject invention and show features of one type of control that can be implemented with the present invention. However, the present invention is not limited to the control law or to the observer disclosed in the patent applications incorporated by reference herein.

BACKGROUND

Injection molding machines of the type covered by this invention have an in-line reciprocating ram or screw which axially moves or translates in a barrel to "inject" plasticized material or melt into a mold having mold halves affixed to platens of a clamp and clamped into a desired position. After injection, the screw maintains pressure on the melt in the mold during a "hold" period while the plastic in the mold solidifies to a desired extent. The screw is then rotated, allowing pelletized plastic from a hopper attached to the barrel to travel within screw flights whereat it is sheared to melt condition and deposited in the barrel in front of the screw. The melt forces the screw rearward until a sufficient quantity of melt is "recovered" at the tip of the screw to form a shot of melt for the next injection cycle. During recover, the mold is opening to allow pins within one of the platens to "eject" the molded part from the mold. After ejection, cores are usually inserted into the open mold and the mold closed and "clamped." The molding machine operation is thus typically viewed as a cycle or sequence of "clamp," "inject," "hold," "recover" and "eject."

In reality, the injection molding machine is much more complicated than what the operating sequence may indicate. In fact, the injection molding machine may be thought of as comprising many machines, each of which must perform its own function while interrelating with and, in some instances, comprising a portion of another machine. For example, the translation of the screw within the barrel to achieve injection is performed by hardware separate from hardware that causes the screw to rotate. However, in recover (and in some instances inject) the screw rotates and translates simultaneously. In other instances, the different hardware items operate independently but in staged sequence to related hardware. For example, the hardware controlling the ejector pins fits within the clamp hardware but operates separately therefrom once the clamp starts to open. A similar result applies to the hardware for setting the cores. Still further, there are other hardware items which operate in a manner that can be viewed independently of the molding sequence although affected thereby. For example, heater band hardware maintain a melt barrel temperature and carriage positioning hardware maintains the barrel in contact with the sprue of the mold unless drool requires separation of the barrel tip from the mold. Still further, general purpose injection molding machines, to which this invention is particularly applicable to, must have an ability to interface with and operate in accordance with third party hardware having its own "legacy" controls. For example, gas injection technology may impose a third party mold hardware added to the machine with produces an inert gas backpressure in the mold that has to be accounted for or interrelated with the machine's hardware for injection and hold. Third party robotics are often used to remove parts, change mold halves and place cores and require the machine hardware to account for such equipment. Special hoppers may intermittently dispense different plastics into the screw/barrel during recover. It can thus be readily seen from this general discussion that an injection molding machine is, in fact, a relatively complex system comprising many different hardware items that must operate in a synchronized manner.

Today's typical control system for an injection molding machine includes an operating station which interfaces with the machine operator who specifies general end conditions or set points that the machine must achieve. For example, the operator during set-up will set the speeds at which the mold opens and close, the mold open distance, injection screw velocity or pressure profile, etc. The set point data will be sent to a programmable machine controller, PLC, which has a programmed sequence routine that takes the set point data into the routine and issues control signals to a number of intelligent controller boards that in turn generate command signals to the various hardware items on the machine. For an example, see U.S. Pat. No. 5,062,052. Typically, the operator station is intelligent with its own cpu and memory and the PLC is intelligent with its own cpu and memory as are the controller boards. In fact, the trend is to establish the operator station as a Windows based pc for use with conventional, off-the-shelf software for monitoring, networking, and SPC purposes while using a more robust, fail-safe operating system for the PLC.

Traditionally, the PLC has been programmed through top-down ladder logic diagrams representing the logical operations needed to perform functions as long series of "rungs" or control relays "and'ed" or "or'd" together. This practice continues today, especially for injection molding machine controllers purchased from generic, control system manufacturers who, working with the injection machine builders customize the system to fit the injection molding machine application. Because the complexity of the injection molding machine has increased, the Boolean ladder logic programming requires more complex operations to be performed in the analog boards and in the control loops for the digital boards.

A number of injection molding machine controllers, including those developed by the assignee, have and do use more traditional programming languages such as assembly or higher level languages such as BASIC, C, C++ and the more recent IEC 1131 programming language. In assignee's Pathfinder control system, a number of specific real time tables were developed and the source code was constructed with commands so that any specific command was linked to a real time table and extracted from that table specific instructions or code needed to perform the command. For example, a "move clamp 120 ton" command would extract from a real time table prepared for a 120 ton machine, the code needed to move the clamp the 9" in travel required by a 120 ton machine clamp. Different tables were then developed for various machines and various options. This approach solved to some extent the problem of avoiding the generation of thousands of new lines of code when changes were made to a base platform injection molding machine. Over time, the real time tables became extensive. However, the tables did not embed or encapsulate the code and did not have a parent/child hierarchal relationship. The controls engineer had to be aware of the communication required between the hardware even though the system was developed to the point where state transitions were placed into real time tables. The system was still highly procedural and "function based." That is, the method implementing the sequence was not tightly bound to the data related to the hardware. Nevertheless, assignee's prior Pathfinder system was and is well suited for implementing the complex routines that are required to control a general purpose injection molding machine in the context of real time.

The problem confronting today's general purpose, injection molding machine manufacturer is not necessarily the responsiveness or functioning of the machine's controller, but the time and expense required to change the programmed routine when the customer specifies a particular machine from the family of machines offered to the market by the machine builder. Assume that a manufacturer offers a line of hydraulic injection molding machines ranging anywhere from an inject/clamp capacity of 100 tons to 1,000 tons. Obviously, the pump hydraulic circuits change within this range. Because the routines are function based, a family of routines can be developed to address the tonnage changes. Within any given tonnage, however, various components can be spec'd to the customer's requirements. For example, the clamp could be a toggle clamp or alternatively a hydraulic clamp. Within the toggle clamp, the clamp could be a 4 pin linkage or a 5 pin linkage type. Special screws for special plastic molding applications may be supplied and the machine may have to function with several differently designed screws. Because the machines are intensely price sensitive and the component changes materially change the machine price, the components are designed with reliability and price foremost in mind. This means that actuators and controls for any given hardware component in any given class of machine may and do change. In simplest terms, a counter for toggle clamp A may count in millisecond increments. In toggle clamp version B, its counter may count in 10 millisecond increments. While the controls engineer will change the toggle code for that machine if toggle B is supplied, he also has to change a number of other code entries or blocks because of concurrent processing (and state transition). For a simple example, inject start may be enabled based on the clamp close function and the inject start is set at millisecond increments for a "standard" type A clamp. If the counter frequency is changed to 10 millisecond increments because toggle B clamp is used, the inject start procedure has to be changed. Further, while the machine is checked for functionality at the factory prior to shipment, a failure to properly implement all the code changes required by the additional hardware or change hardware may not evidence itself immediately. For example, a problem may not surface until the time the customer attempts to mold a different plastic in a special mold, etc.

Further compounding the problem is the gravitation in the industry from hydraulic powered machines to electric powered machines and to hybrids (see for example U.S. Pat. No. 6,089,849). The machines on a hardware, platform basis are materially different and require different control concepts although the machine sequence remains the same.

In contrast to the structured analysis (SA) methodology achievable by the higher code languages, specifically C++ and IEC 1131 which lend themselves to lifting procedural programming concepts up to the modeling level by functional decomposition and flow of information required in SA approach, there is another modeling approach known as object-oriented (OO), which was developed in the late 1980's and is widely used in business and data domain applications today. Objects, which are instances of a class (alternatively, a class is an abstract of an object), have code indicative of behavioral characteristics and data attributes which have known characteristics of encapsulation, polymorphism, data abstraction, inheritance, etc., and are linked or communicate together to establish a programmed routine. The object characteristics available in object oriented methodology makes the system well suited for modeling the type of control system used in an injection molding machines, particularly the ability to reuse objects when the composition of the machine changes without having to reprogram or debug the entire system. See for example, *Real-Time UML: Developing Efficient Objects for Embedded Systems*, by Bruce Powel Douglass, Addison Wesley Longman, Inc., 1998. However, the objects required in an injection molding system require considerable programming. Unlike other embedded control systems, injection molding machine controls, at least the injection molding machines which are the subject of this invention, have extensive, sophisticated control laws and considerable hardware that requires a large number of objects and accordingly an extensive amount of OO programming has to be written.

As of the date of this invention, OO methodology has not been believed used heretofore to control the entire machine or to model the routine used to control the machine. It is not known, but it is believed possible, that certain components of an injection molding machine, which could include third party auxiliaries, may have used OO techniques to develop a block of code used for that component which may be interfaced with or incorporated into the overall control scheme. In this regard, it should be noted that certain programming languages, specifically C++ as it has evolved from C, does have certain blocks of code or subroutines that build objects in an OO sense, and a programmed system with C++ will have objects formed by the code. The system, however, simply because it is programmed with C++ language is not an object oriented programming system. In contrast, the development system, Smalltalk, is developed for use in an object oriented control system. The programming language requires all code to be written about classes and data in object form. However, neither Smalltalk (nor Java) have been believed used to control an injection molding machine in hard real time because considerations related to speed and performance indicate that such programming languages are not preferred for injection molding machines.

SUMMARY OF THE INVENTION

Accordingly, one of the principle components of this invention is the provision of an objected-oriented programming system to control the entire machine cycle of a plastic, injection molding machine.

Another aspect of the invention is the development of an object-oriented control system which allows any specific plastic injection molding machine to be readily modeled.

One aspect of the invention includes a plastic injection molding machine that has a screw within a barrel and a screw injector mechanism for axially translating the screw within the barrel to inject a shot of melt into a mold and a clamp containing a mold separable along a parting line and a clamp mechanism for opening, closing and clamping the mold within the clamp. The molding machine has a computerized control system having an object-oriented program for controlling the operation of the clamp and translation of the screw during the molding cycle. The program includes i) a clamp class corresponding to the clamp mechanism which, when instantiated, produces a composite clamp object effective to control the clamp, and ii) a screw injector class corresponding to the screw injector mechanism which, when instantiated, produces a composite injector object effective to control the injection performed by the screw whereby the benefits of object oriented programming is realized in a system establishing classes corresponding to major hardware components which facilitate their construction.

In accordance with another aspect of the invention additional classes are modeled corresponding to machine hardware performing specific injecting molding cycle phases such as eject, recover, etc. Preferably the classes are aggregates and modeled to descend in child/parent relationships for ease in formation by difference concepts present in inheritance.

Another feature of the invention resides in a method for controlling the operation of an injection molding machine having a screw axially translatable in a barrel by a screw injector to cause injection of a shot of melt into a mold and a clamp operable to open, close and clamp the mold contained therein by clamp hardware associated with the clamp. The method includes the steps of:
A) generating an object oriented, computerized, programmed routine in source code controlling the sequence and implementation of injection and clamping functions of the machine by command signals produced during run time, the object oriented routine including i) a master sequence class defining behavior of the machine through the machine cycle in accordance with a machine control law, ii) a clamp class defining behavior and attributes of the clamp mechanism and owning a plurality of constituent classes and iii) a base screw injector class defining screw attributes and behavior of the screw during injection and owning a plurality of constituent classes;
B) instantiating the classes when the routine is run to produce from the source code at any instance i) a base clamp object having attributes and defining behavior of the clamp hardware and ii) a screw injector object having attributes and defining behavior of the screw hardware; and,
C) compiling and linking or interpreting or assembling the source code from the base clamp object and the screw inject object into object code processed by the microprocessor in the control system to produce command signals outputted by the system to actuators associated with the screw and the clamp and controlling the behavior thereof whereby the machine cycle can be controlled efficiently and effectively by a program constructed in accordance with object oriented methodology.

In accordance with yet another feature of the invention, a conventional plastic injection molding machine having hardware and associated actuators permitting the machine to mold parts in a sequenced cycle including clamp, inject, hold, recover and eject and including a microprocessor control system controlling the operation of the actuators to produce a molding cycle meeting set points established by an operator of the machine with the microprocessor control system including at least one controller regulating specific machine hardware to meet the set points for a sequence in the cycle, is improved on as follows: the controller being programmed as an object-oriented programmed sequence having a controller class instantiated as a controller object with behavior transitioning from at least a first state to a second state, preferably in advance of the time a state transition is to occur, and the controller class has attributes related to the hardware and machine actuator controlled by the controller whereby an object oriented program constructs a state machine to assure transitioning of the molding cycle sequence at the proper time in the molding cycle.

In accordance with the above improved inventive feature, the object oriented program sequence further includes an actuator class in relationship to the controller class and instantiated to produce an actuator object controlling the behavior of the actuator regulated by the controller in accordance with state instructions from the controller object. Still further, the object oriented program sequence further includes an observer class in relationship to at least the actuator class and instantiated to produce an observer object indicative of the behavior of the machine hardware and its associated actuator(s) whereby a triad of controller-observer-actuator are programmed as object oriented classes in a state machine assuring proper machine control and actuation of the molding cycle. Because each of the class objects use object oriented principles of polymorphism, inheritance, data encapsulation, etc., sophisticated and mathematically intensive state machine programs can be readily constructed for any of the major machine hardware components of the injection molding machine with less effort than what is required using conventional modeling techniques while significantly reducing program errors that otherwise inevitably occur.

Another important feature of the invention resides in the provision of a modeling method for assembling source code into an object oriented programmed routine for controlling any specific injection molding machine having hardware actuators controlling hardware machine components performing an interrelated machine molding cycle of close, inject, hold, recover and eject pursuant to a general, sequence control law common to all injection molding machines. The method includes the steps of:
a) building an object oriented class library collection by modeling as general classes therein a class corresponding to attributes and behavior of major machine components necessary to perform each step of the molding cycle including at least the general, abstract classes of a clamp class, an inject class, a rotate class and an eject class and relations therebetween; specifying for each general class a plurality of more specific child classes, each child class inheriting the attributes and behavior of its parent class and adding thereto additional attributes and behavior more specific to different hardware components used in injection molding machines for performing the function controlled by the general abstract class and optionally specifying additional descendants until all different types of molding machine hardware performing the behavior of the realizable descendants have been modeled, principally by difference;
b) building a component library including i) a collection of primitive components corresponding to the assembled classes including usage relations, associations and aggregations for the realizable and selective abstract classes, ii) a subsystem collection of related primitive components is specified and iii) a machine variant component in which desired subsystems for a specific machine and making up the control system for a desired machine are selected; and, c) adding additional objects of classes depending from classes in the subsystem for any specific machine, principally by difference, to account for any specific requirements of the specific machine not accounted for in the subsystem collection whereby any injection molding machine using existing hardware components can be programmed to produce a molding machine cycle.

In general a summary of some of the objects, features or advantages of the invention can be said to include one or more of the following:

a) An OO program is used to control the sequencing of an injection molding machine by modeling the machine hardware to fit the molding cycle producing an intuitive type model which can be readily changed to fit any application.

b) The machine control of an injection molding machine is object oriented programmed so that a) programming errors are reduced, b) time for programming injection molding machines is reduced, c) better injection molding machines are produced and/or d) hardware changes, whether changes in existing hardware or future hardware new developments can be easily and readily programmed into the control.

c) An extensive parent/child OO program model is developed for an injection molding machine permitting machine control programs to be literally assembled for any type of injection molding machine.

d) An OO program model is used to construct a program for controlling an injection molding machine in which at least the major components of the machine are controlled as state machines.

e) The machine control for an injection molding machine controls at least some of the machine components by OO program state machines having controller, observer and actuator classes or equivalents to i) assure state transitions, ii) assure state transitions in advance of the time actually required for the state transition to account for response latency in the machine and/or jitter in the control, and/or iii) permit the inclusion of sophisticated and/or mathematically intensive calculations to perform the class functions with a) relative ease, b) minimized error and/or c) reuse, principally by difference.

f) The control system for an injection molding machine is OO programmed so that a modeling library can be constructed utilizing OO classes and relationships tied to machine components or assemblies permitting complicated and sophisticated control systems to be modeled for any injection molding machine and variant thereof.

These and other objects, features and advantages of the invention will become apparent to those skilled in the art upon a reading of the Detailed Description of the Invention set forth below taken together with the drawings described below.

DETAILED DESCRIPTION OF THE DRAWINGS

The invention may take form physical form in certain parts and in arrangement of parts, preferred embodiments of which will be described in detail below and illustrated in the accompanying drawings which form a part hereof and wherein.

Figure 5:
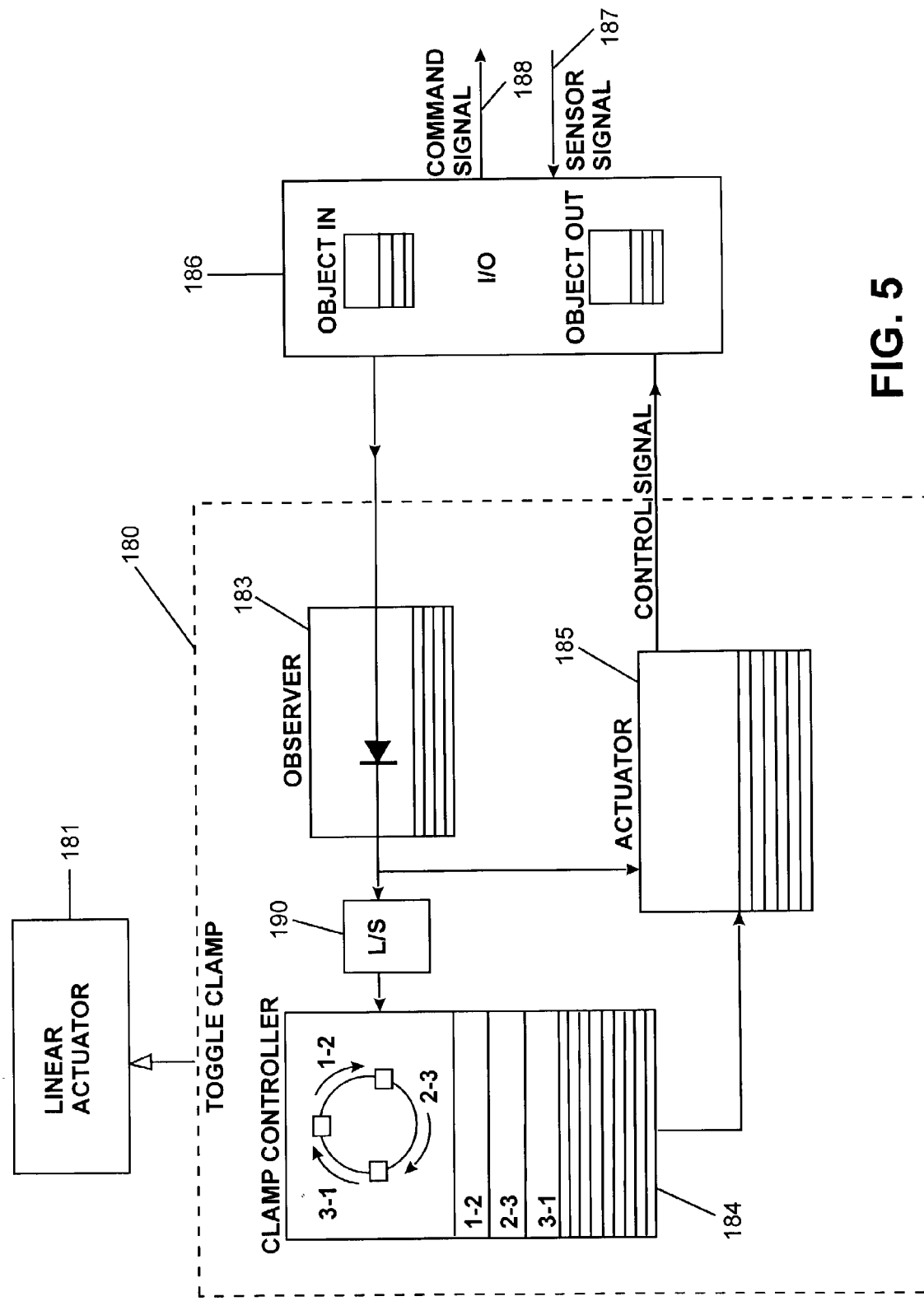
FIG. 5 is a schematic depiction of a controller, observer and actuator shown in the collaboration diagram of FIG. 4A.
Figure 6A:
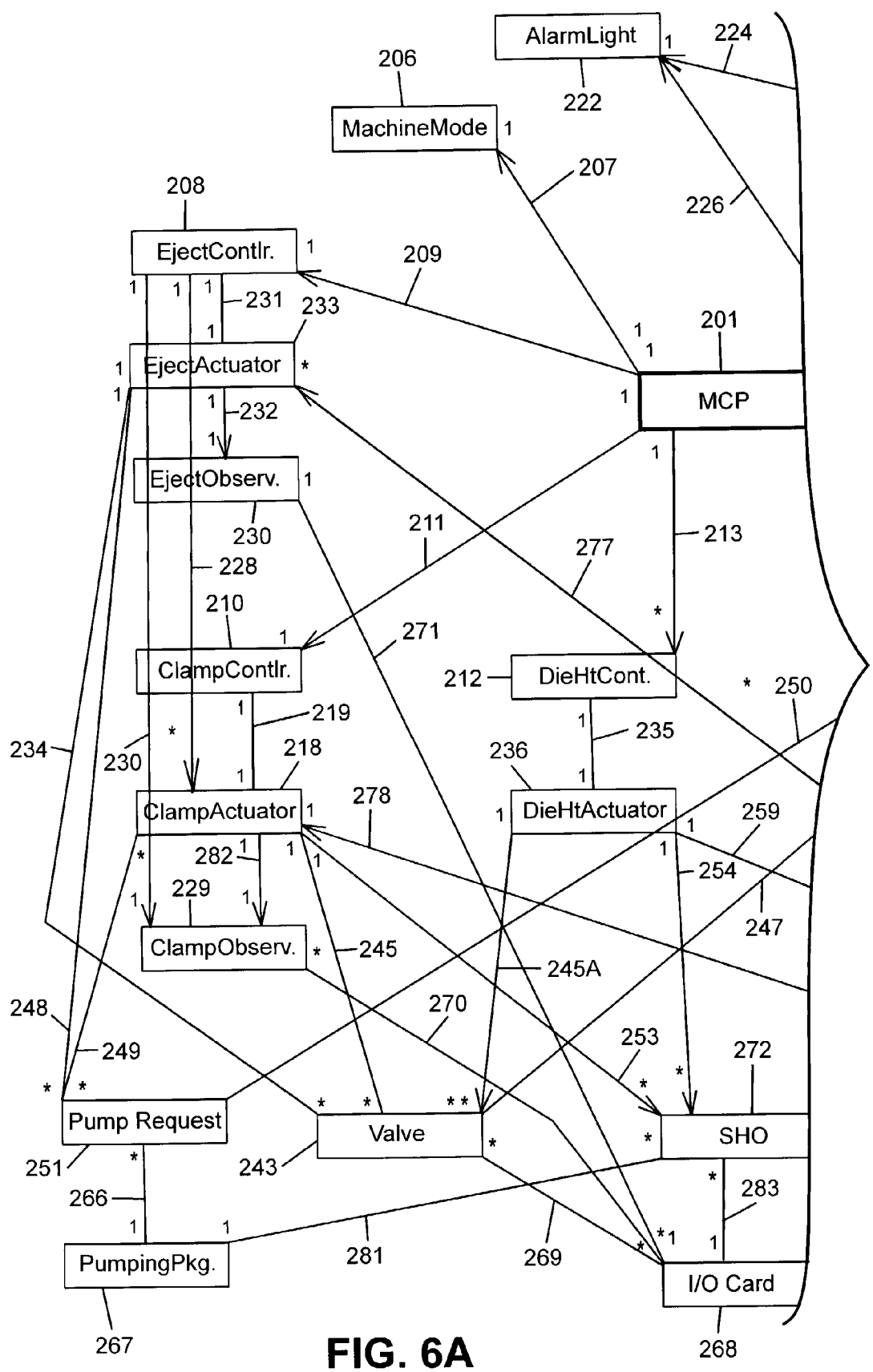
Figure 6B:
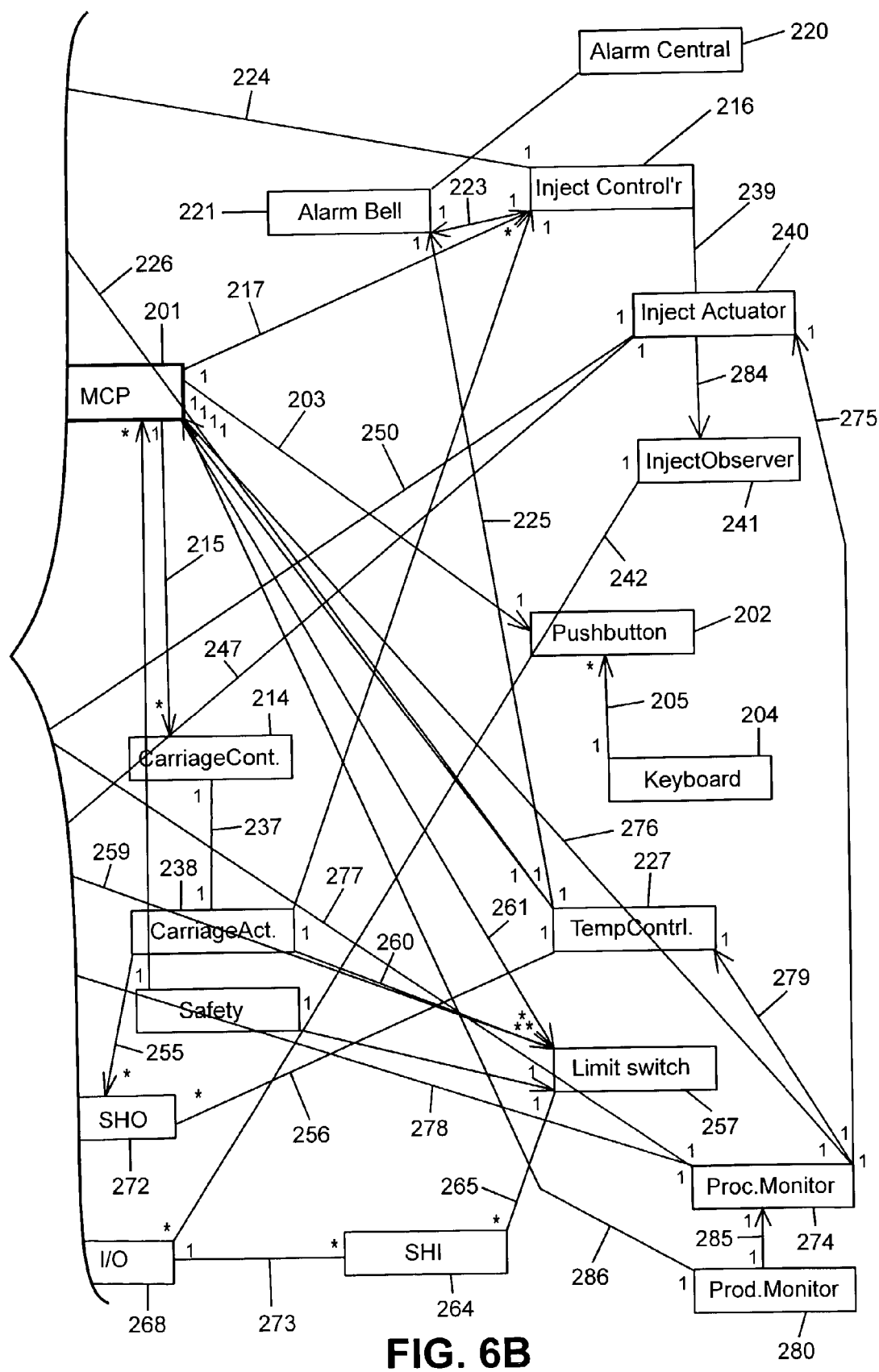
Figure 7:
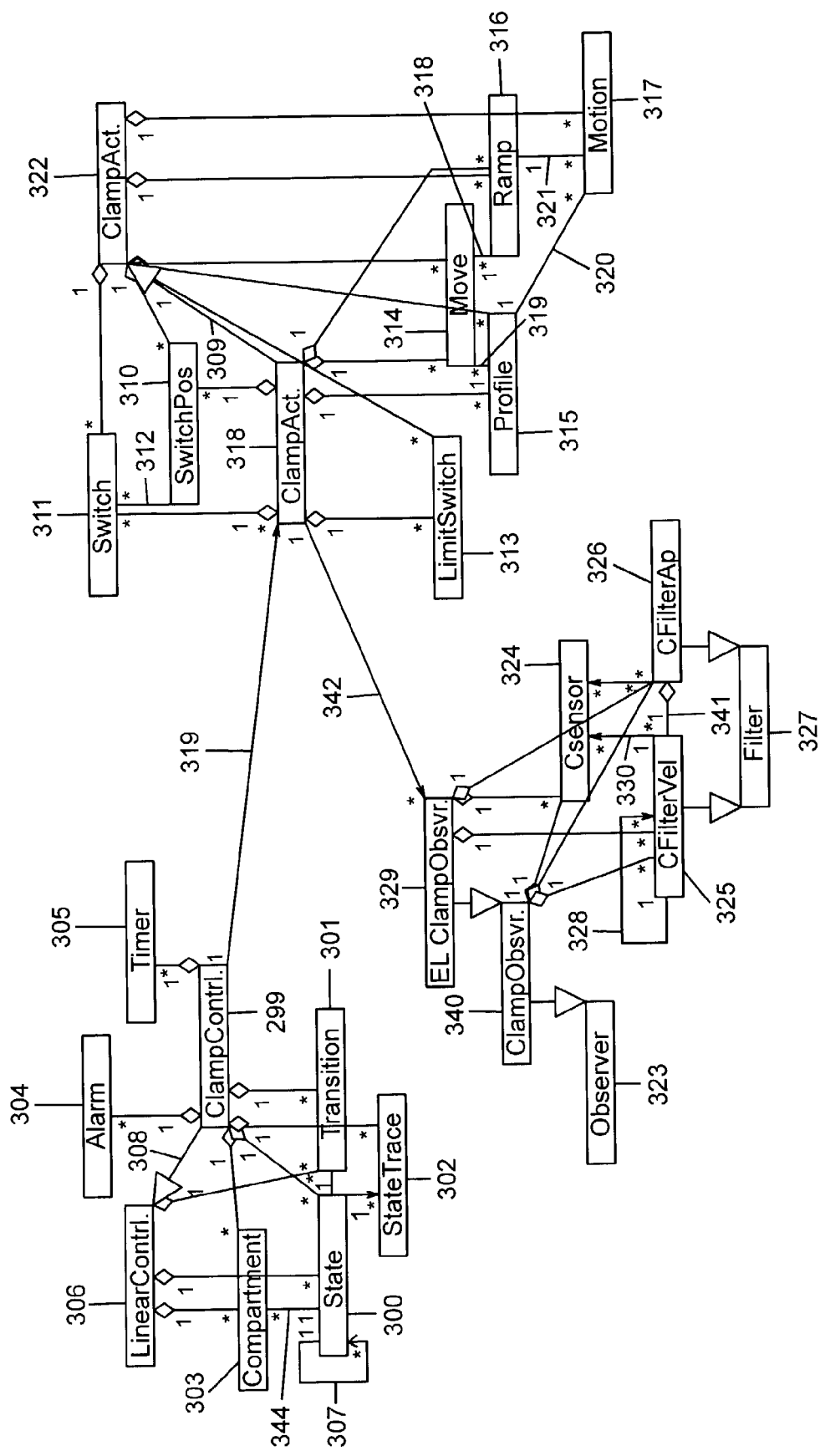
Figure 8:
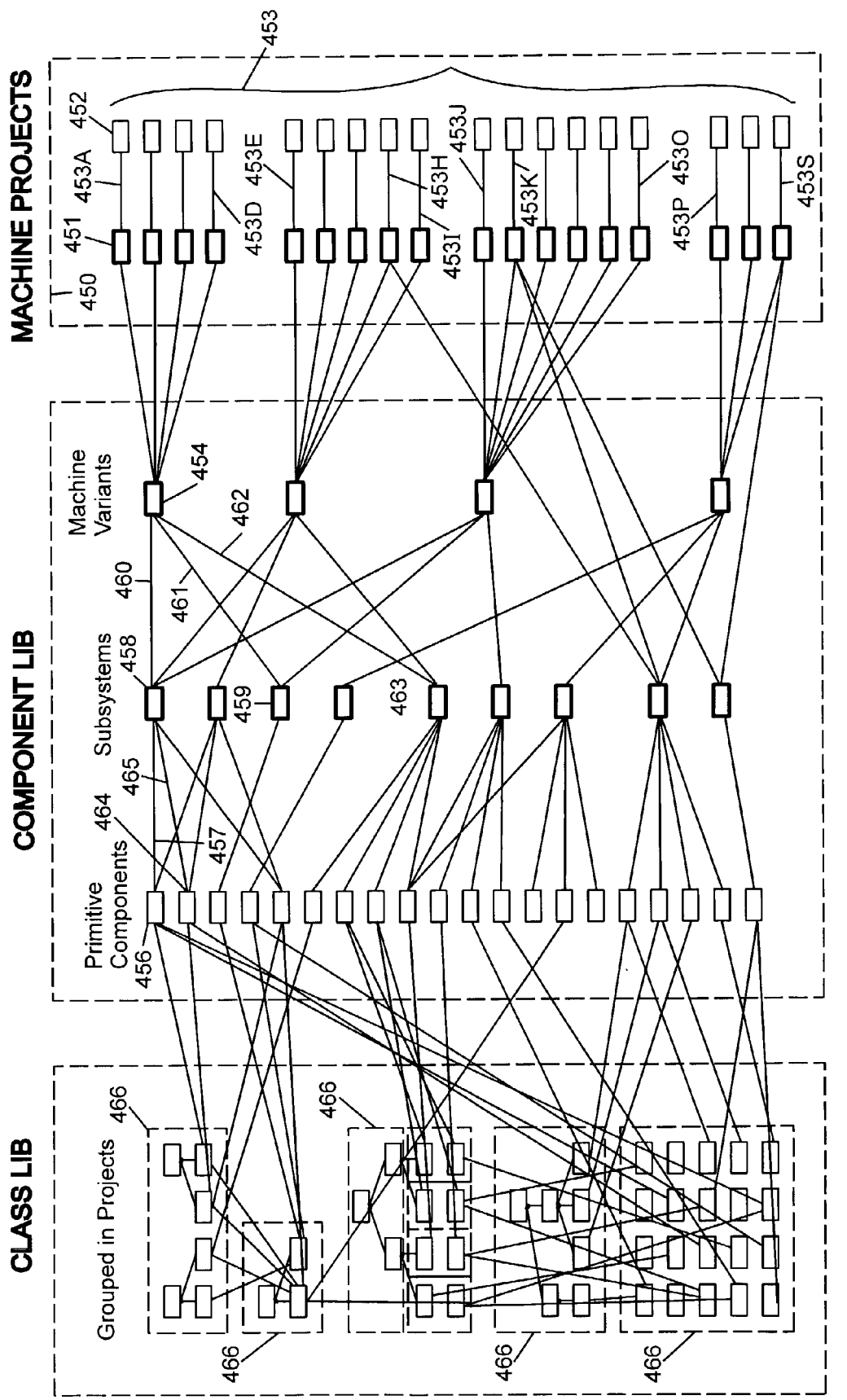
Figure 9:
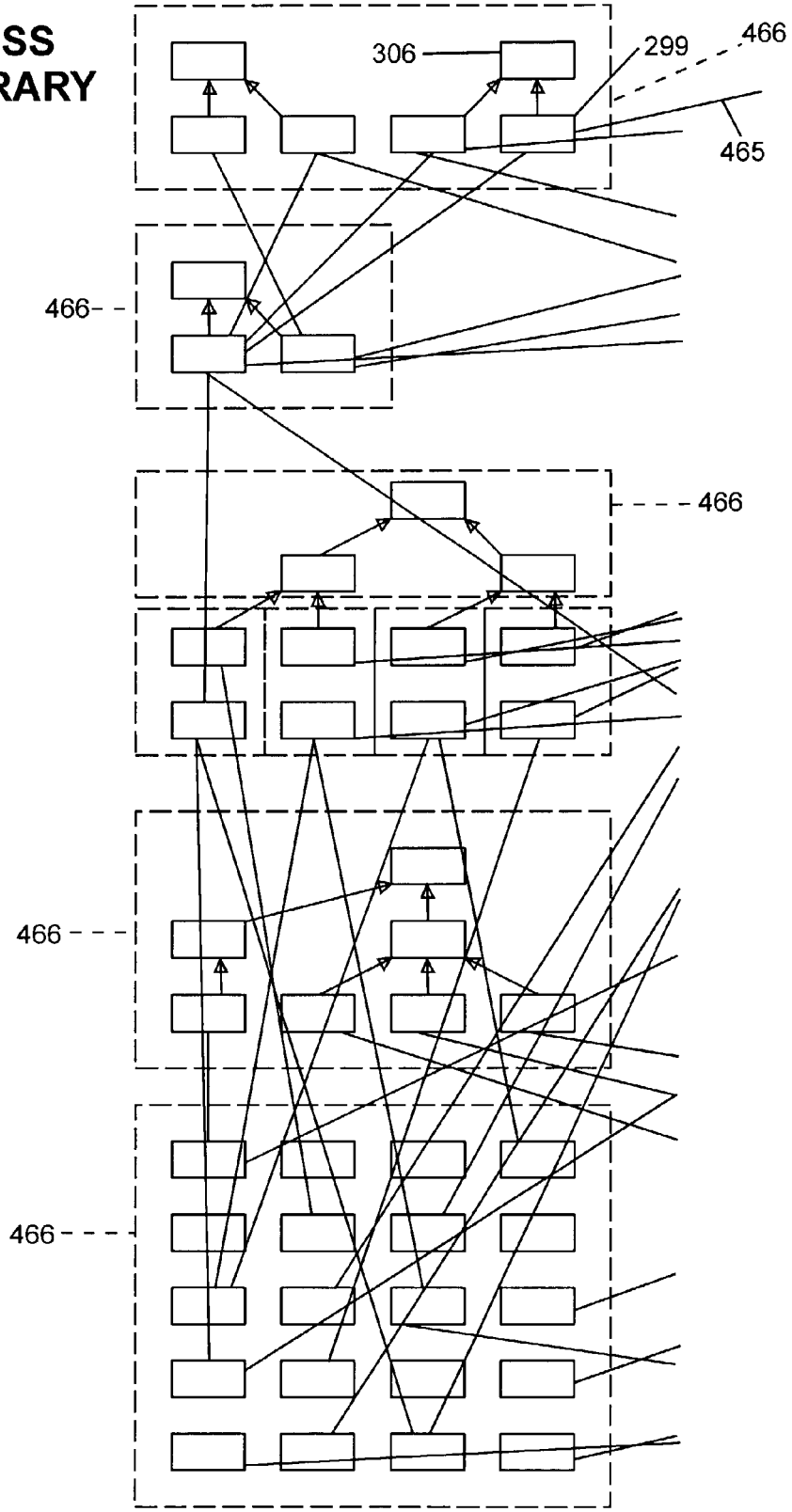
Figure 10:
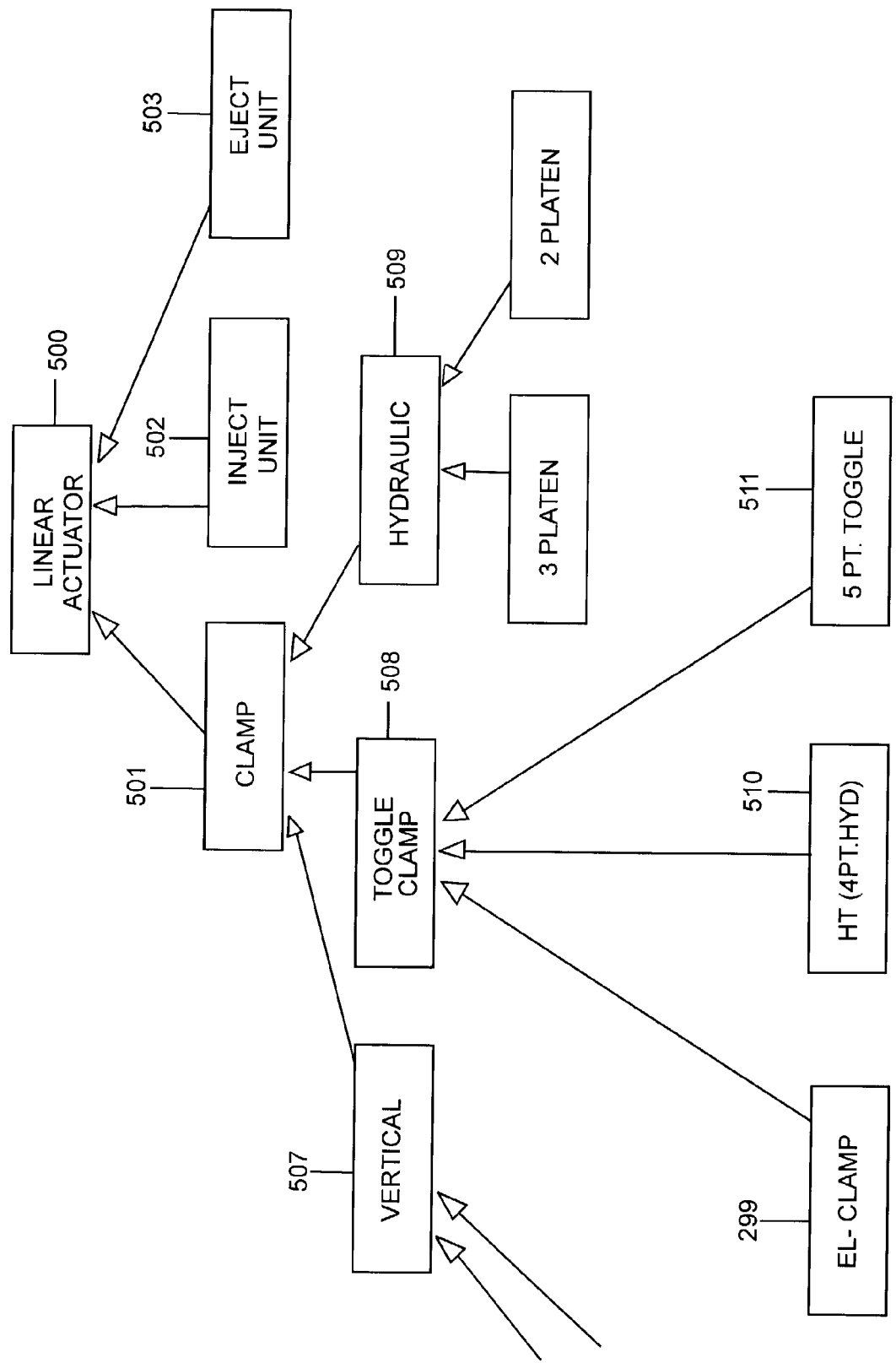

FIGS. 6A and 6B, together, constitute a machine class diagram for the sequencer class which controls the machine cycle;

FIG. 7 is a class diagram comprising controller, observer and actuator classes for implementing functions of the major classes depicted in FIGS. 6A and 6B, and shown in FIG. 5;

FIG. 8 is a schematic illustrating how classes and their objects may be arranged into libraries and components to produce software operating a wide variety of machines;

FIG. 9 is an expanded schematic of the class library depicted in FIG. 8; and,

FIG. 10 is a class diagram showing a portion of a general parent/child abstract class diagram illustrating the clamp class relationship.

DETAILED DESCRIPTION OF THE INVENTION

Referring now to the drawings where the showings are for the purpose of illustrating preferred embodiments of the invention only and not necessarily for limiting same there is shown in FIG. 1 a schematic representation of a plastic injection molding machine 10 of the hybrid type having an injection mechanism 11 and a clamp mechanism 12.

For terminology convenience and in order to avoid ambiguities, it should be understood that reference to "hydraulic drive" and "electric drive" and "drive systems" means the entire power transmission or drive train including the motor, its control, the coupling, etc. Reference to "motor drive" means the control used to govern the operation of the motor in response to a command signal issued by the machine's control system.

Injection mechanism 11 includes a screw 14 translatably and rotatably disposed within a tubular barrel 15. Translation of screw 14 within barrel 15 is achieved by a hydraulic actuator or hydraulic coupling shown to include a sealed piston 16 movable within a cylinder 17. Screw rotation occurs by rotation of drive shaft 18 secured to a mechanical coupling 20 which, in the preferred embodiment, is a gear box. For schematic illustration purposes, drive shaft 18 is shown splined to piston 16 so that piston 16 can slide within cylinder 17 to cause translation of screw 14 while the rotation of drive shaft 18 causes piston 16 to rotate screw 14.

Barrel 15 has an open end 21 in fluid communication with clamp mechanism 12. In the preferred embodiment, a shut off valve diagrammatically represented by reference numeral 22 actuated by a solenoid 23 is conventionally provided at open end 21 to selectively permit or prevent fluid communication of molding material within barrel 15 with clamp mechanism 12.

Clamp mechanism 12 includes a stationary platen 25 and a moveable platen 26 which moves along tie rods 28 extending therethrough. Mold sections 29a, 29b are mounted to stationary and movable platens 25, 26, respectively, to define a mold cavity 30 when in a mated relationship as shown. A hydraulic actuator or hydraulic coupling in the form of a clamp piston 32 disposed within a clamp cylinder 33 causes movable platen 26 to travel along tie rods 28 to part mold sections 29a, 29b and open the mold or to bring mold sections 29a, 29b into mated relationship and close the mold under pressure. Alternatively, clamp piston 32 can actuate a mechanical toggle linkage to close mold sections 29a, 29b. Not shown in FIG. 1 is an ejector hydraulic drive for moving the molded part from mold cavity 30 after the part has solidified and cooled nor is their shown a hydraulic actuated core setting mechanism for setting cores into mold cavity 30 prior to closing the mold and injecting molding material into mold cavity 30.

Movement of screw piston 16 is controlled by an injection directional proportioning valve 35. Similarly, movement of clamp piston 32 within clamp cylinder 33 is controlled by a clamp directional proportioning valve 36. Again, FIG. 1 is schematic. In actual operation, an injection manifold which includes, but is not limited to, valves controlling output of an injection pump(s) is typically provided and similarly a separate clamp manifold of valves is provided for controlling pressure and flow from a clamp pump(s). However, in each of these manifolds, a separate proportioning valve is used. The proportioning valves can be flow control only (preferred) or both pressure and flow can be regulated.

The preferred arrangement allows high hydraulic pressure to be exerted to close mold sections 29a, 29b at which point clamp valve 36 moves to the position shown to trap the fluid at its high pressure. A similar result occurs with injector valve 35. However, as the molding material cools in mold cavity 30 during packing, screw 14 will advance and pressure will dissipate causing valve 35 to open, etc.

A constant delivery pump 38 is provided for moving clamp piston 32 and injector piston 16 in a controlled manner vis-a-vis clamp valve 36 and injector valve 35. Pump 38 is provided with a conventional safety relief valve 39 connected to sump 40. Pump 38 is driven by a pump AC induction motor 42. At this point, the hydraulic arrangement as described above is conventional. In the hybrid arrangement disclosed in FIG. 1, an AC induction motor (synchronous or DC brushless or even DC brush type motor can be used) hereafter referred to as rotate drive motor 45 drives mechanical coupling 20 for recover.

There are several transducers mounted on the injection molding machine which develop signals indicative of the condition of the machine. These sensors include a sensor measuring the pressure of the fluid acting on piston 16 developing an injection pressure sensor signal shown by reference numeral 49. Similarly, a pressure transducer develops a signal indicative of the pressure exerted on clamp piston 32 developing a clamp pressure signal on line 50. There are also transducers indicating the screw position and screw rotation or RPM. The screw position and rotation signals are transmitted on line indicated by reference numeral 51. Similarly, there is a clamp transducer generating a clamp position signal on line 52. The feedback signals described are inputted to a machine controller 54. The transducers are shown as separate instruments for explanatory purposes only.

Generally, machine controller 54 essentially comprises two units, namely, an operator station 56 and a programmable logic controller or PLC 57 which may be implemented as one unit. Operator station 56 includes a display unit, either an LCD, EL or a CRT, visually displaying set up and machine conditions and a key pad or a key board into which the operator sets the mold cycle data he wants the machine to run at. Basically machine controller 54 generates command signals in response to a programmed routine and sensor signal input. The command signals are outputted (preferably through I/O modules—not shown) as command signals which control the hardware on the machine. Insofar as the general schematic FIG. 1 is concerned, the command signals generated by controller 54 include a valve clamp command signal on line 59 controlling operation of clamp valve 36. Similarly, an injection command signal is generated on line 60 controlling the operation of injection valve 35. Additionally, a rotate command signal is generated on line 62 to vector control drive 46 for controlling the speed of AC rotate motor 45. A pump motor command signal is generated by control 54 on pump command signal line 63 to a control drive 43 controlling the speed of electric pump motor 42.

Figure 1A:
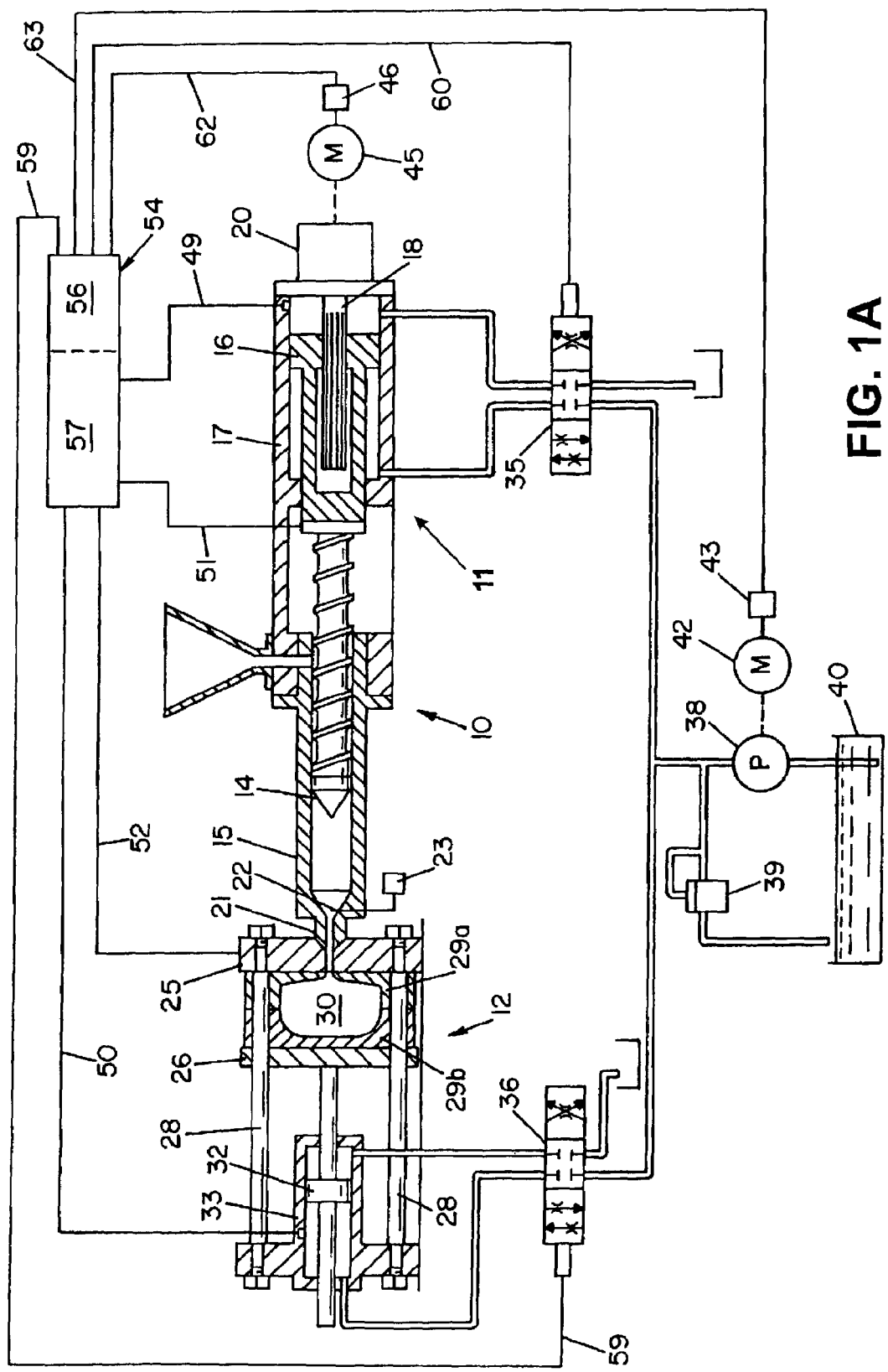
FIG. 1A is a schematic representation of a conventional hybrid injection molding machine.

The molding cycle sequentially proceeds in stages or phases from mold closing to injection, pack or hold, recovery, mold opening and eject. Command signals are developed by controller 54 to cause the machine to perform this sequenced molding cycle. Significantly, a number of motor command signals on lines 62, 63 for any step are outputted for each step. For example, the speed of pump motor 42 is not necessarily set to one value for the injection step. Instead, a number of commands are generated by controller 54 during the injection step causing the speed of motor 42 to vary the speed of constant discharge pump 38 so that sufficient fluid (and pressure) is supplied injection valve 35 to perform the injection step at any given time. Similarly, the speed of rotate motor 45 is variably changed through a series of command signals at millisecond time intervals generated by controller 54. It is to be appreciated that FIG. 1A is a simplified, conceptual diagram. In practice, the system is significantly more complex and contains many pump systems, valves, interlocks, etc. to perform the basic functions shown. For example, separate pump systems may cut in and out on a pump demand command.

Figure 1B:
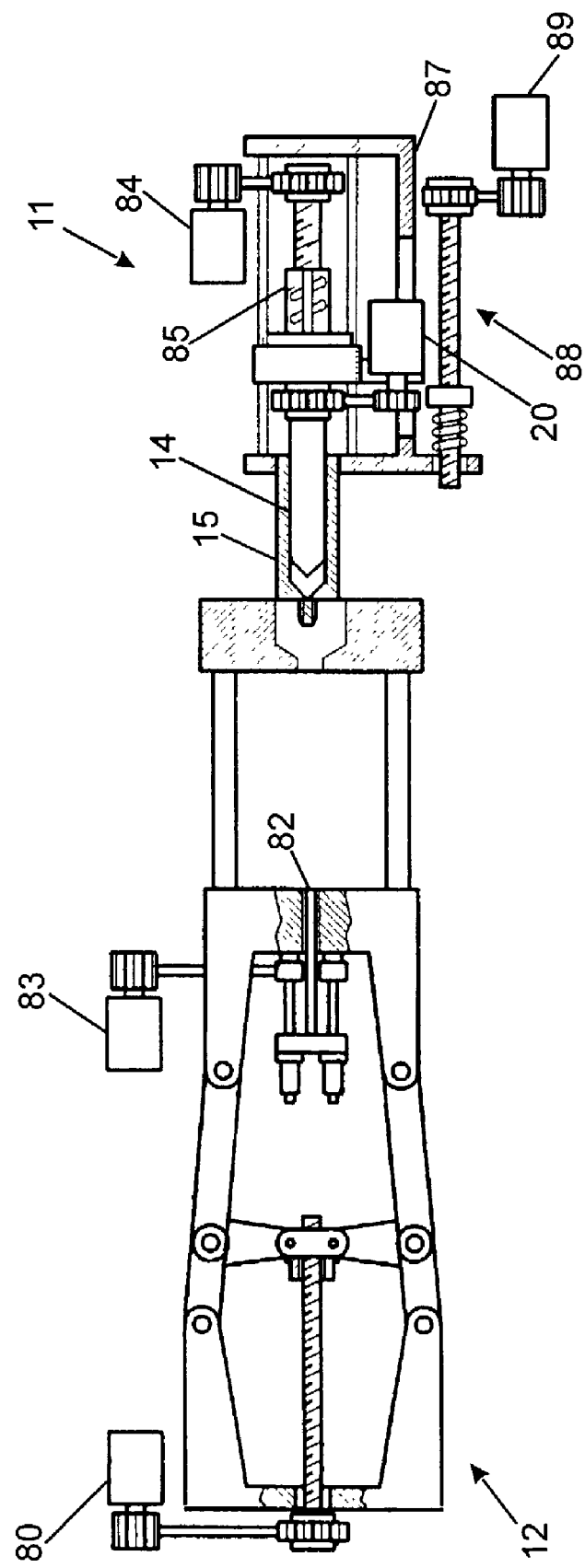
FIG. 1B is a schematic representation of a conventional all electric injection molding machine.

A conventional all-electric molding machine is illustrated in FIG. 1B and, where possible, the reference numerals for FIG. 1A will apply to like parts for the electric injection molding machine 10 of FIG. 1B. While the hydraulic actuators for the hybrid machine of FIG. 1A are powered by a common pump (or a series of pumps) with each hydraulic actuator separately controlled by a proportioning valve, the all-electric machine has, generally speaking, separate motors (and their corresponding drives) individually controlling the sequences of the injection molding cycle. Thus, in FIG. 1B, a clamp motor 80 controls opening and closing of clamp mechanism 12 which is shown to be of the toggle type. Illustrated in FIG. 1A is an ejector pin 82 driven by an ejector motor 83 not shown in FIG. 1B. For drawing clarity, neither FIGS. 1A or 1B show the conventional die height adjustment mechanism which is present for any clamp mechanism. Typically, the die height is adjusted by electric motors, even if the machine is a hydraulic machine. In the electric machine, injection is typically accomplished by an injection motor 84 typically driving a ball/screw arrangement 85 for translating the screw. Recover is effected by motor 20 in the same manner as that done for the hybrid machine. Because the electric machine must have mechanical couplings for screw inject/recover functions, injection mechanism 11 is carried on a frame or carriage 87 that carries barrel 15. Barrel 15 must remain in contact with the mold sprue during injection and this is accomplished by a touch control mechanism 88 actuated by a touch control motor 89. The carriage on a hydraulic machine can be retracted to gain access to the barrel tip and sprue if needed. However, the barrel is typically locked by the hydraulics so there is no need to maintain the barrel in contact with the screw.

One of the reasons for illustrating the electric machine is not only to show the significant differences in hardware between the two types of machines, but also to illustrate that all of the driving connections performed by the hardware in the electric machine must be done through mechanical couplings, typically ball/screws, whereas the drives are effected by hydraulic couplings for the hydraulic machine by a power source which is "instantly" available on demand. The mechanical couplings (varying frictional forces) and the response of an electric motor (torque/speed characteristics) produce an entirely different set of variables that have to be accounted for in the control system of an electric injection molding machine which are not present in a hydraulic injection molding machine.

This invention produces a control system for all types of injection molding machines from a common system model notwithstanding the different parameters of the machines which have to be accounted for in the model. One reason this is possible resides in the fact that all injection molding machines have specific (but different) hardware for accomplishing the molding cycle (for in-line reciprocating screws) of eject, close, inject, recover and open.

Having defined the basic operating sequence of an injection molding machine, the inventive control system for the machines can now be discussed. As indicated above, an underpinning of this invention is the utilization of an object-oriented system to produce an object-oriented programmed sequence to control an injection molding machine. More specifically, a system model sufficient to cover any injection molding machine platform and any alteration of components within a platform is constructed in accordance with object orientation concepts. This model is distilled into programmable source code for any specific injection molding machine. As is conventionally known, the source code is compiled or interpreted into a machine readable object code processed by the microprocessor in the machine controller to produce "command" signals (sent via I/O modules) for regulating associated hardware on the machine. In describing the invention, terminology well known in the object-oriented art will be used and it is intended to use the terminology herein in accordance with its well known, customary meanings. To avoid any confusion, terminology when used herein which is defined below will have the meaning ascribed to the words as defined below and terminology not defined is to be ascribed its customary ordinary object-oriented (OO) meaning.

"Controller" means, depending on usage, the overall machine control, or a specific control for a machine hardware item, or a component of a control-processing logic.

"System Model" means a collection of information describing hardware (physical components) of an injection molding machine and the behavior of that hardware (i.e., such as source code). The collection of information is structured in a manner that permits it to be extracted, distilled and assembled pursuant to OO concepts. Preferably the information is collected in a manner that permits it to be modeled in UML (Unified Modeling Language—a language expressing the constructs and relationships of complex systems). The information collection can be in the form of templates, tables, table templates, spreadsheets, relational data bases and the like and even simpler data collections such as abstract data types, i.e., "structures" or data-type definitions in source code files.

"Distillation" is used in the sense that techniques employed in OO and characterize OO (such as encapsulation, polymorphism, aggregation, modularization, inheritance and the like) are applied during extraction of information from the model in the form of classes, objects and data attributes which are assembled into a programmed or sequenced routine. In its simplest form the programmed routine is source code resulting from communicating objects from the model to perform a desired sequence of events. However, certain data from the model may take the form of binary data as well as source code all of which are intended to fall within the meaning of "programmed routine." For example, in one implementation of the invention source code is assigned to the class behavior (and objects instantiated from the class) while the data attributes of the objects can be described with simple binary tables or even further, simply referenced, for common data, by a coded symbol.

"Compilation" is the conversion of the programmed routine into machine language that can be processed by the cpu and its associated Ram/Rom memory. Assuming that the programmed routine comprised only source code, the executable real time image would result from the compilation of the source code into object code. Because the programmed routine may comprise information other than that typically associated with source code (in the preferred implementation the source code is IEC 1131 or C++), "routine" is used to cover any language that is processed or "executable" by the microprocessor in the controller.

The "operating system" used in the invention is one that responds to input in real time in contrast to general-purpose operating systems such as DOS and UNIX. In the implementation of this invention the commercially available OnTime operating system (RTOS—real time operating system) is used although any real time system such as Windows, or any custom or proprietary operating system can be used. The operating system implemented allows multithreading (different parts of a single program to run concurrently) and preferably multitasking (more than one program can ran concurrently). The operating system is used in its normal sense of providing a software platform on top of which application programs, i.e., the programmed routine, can run and provides basic tasks, i.e., keyboard input, display screen output, disk files and directories, peripherals. Additionally, given the complexity of the inventive system, the RTOS has some traffic cop responsibilities to prevent interference in the program execution.

"Classes" define and or represent a collection of attributes and behavior of "things" or entities in a system.

"Objects" are instances of classes that use the behavior and specifies the value of the attributes of the class. Objects are created or "instantiated" to use the class attributes and behavior.

"Data Abstraction" defines the essential characteristics of an object from the users perspective and implies a structuring of the program by objects rather than by procedures.

"Encapsulation" is the ability to combine code with data, encapsulated, within the object. Internal details of the object are hidden from the outside world. The objects can be used without knowledge of its internal details.

"Inheritance" is the ability to derive new classes from existing classes while maintaining or inheriting the functionality of the existing class. The "new" class or the "child" or "descendent" class has all the characteristics defined by the "parent" although the child might specialize the characteristics of the parent or the child may also extend its parent class by adding additional attributes and behavior. As will be explained below, this invention uses multiple parent/child class relationships extensively to permit objects to be specified by difference to avoid producing new code required in a SA (structured analysis) approach.

"Polymorphism" allows sharing of names, attributes, and particularly, behaviors among many classes allowing the class to specialize the behavior and thereby responds to a common message in its own way or manner.

"Aggregation" applies to a relationship when one object physically or conceptually contains another object. The larger class is known as the owner or the whole and the smaller class is the owned or part or constituent class. As will be explained below, the controller, observer and actuator are aggregate objects owning component classes formed from multiple levels of embedded objects, and, in turn, the controller, observer and actuator are owned or are constituent parts of the aggregate clamp object as a whole.

Figure 2:
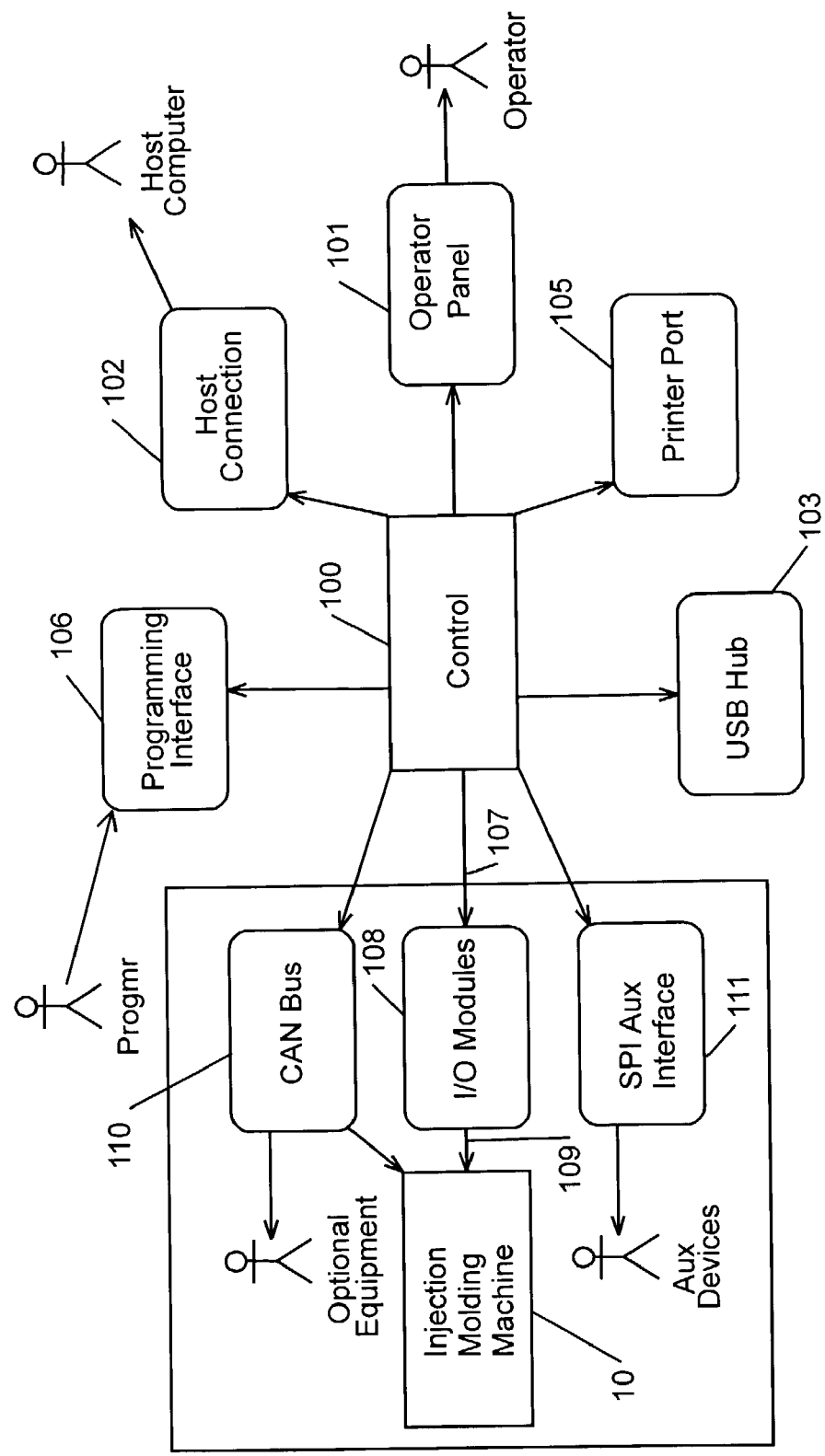
FIG. 2 is a context diagram of the overall control system using the present invention.

Referring now to FIG. 2, there is disclosed a general context diagram of the overall control system including the stick figures or "actors" which provide an outside interaction with the control system. The basic control 100 communicates with an operator panel 101 which allows for an operator to enter set point data to control 100 and view or obtain monitored data. (It is to be understood that the programmed routine is operated or acted on by the compiler or interpreter generating object code in control 100. The programmed routine defines instructions to perform the machine's control law for performing the machine cycle as well as perform the other tasks noted in the control diagram. While all the tasks performed by the control are programmed in OO methodology, the invention is principally concerned with the OO methodology implementing and controlling the machine sequencing pursuant to the machine's control law.)

Additionally control 100 communicates through host connection 102 to a host computer which can also enter set point data and receive monitored information. Peripheral communications can be had through a USB hub 103 as well as a printer port 105 and a programming interface 106 is provided for diagnostics, update releases, troubleshooting etc. In the inventive system, control 100 generates command signals on line 107 to simple I/O modules 108 which reform the command signals (analog or digital) on line 109 to hardware on injection molding machine 10. Optional equipment which interacts with the molding machine process such as core setters or gas injection units and which can have its own legacy program interact with control 100 on a central area network bus 110. Additional equipment which indirectly interacts with the molding machine such as robots conveying parts from the machine and are programmed with SPI protocol interact with control 100 through an SPI interface 111. While the control system has many functions, this description will center on the machine cycle. It is noted that the interaction of a microprocessor with some of the items noted in FIG. 2, such as controlling a monitor or printer port have long been done in the PC world by OO systems.

Figure 3:
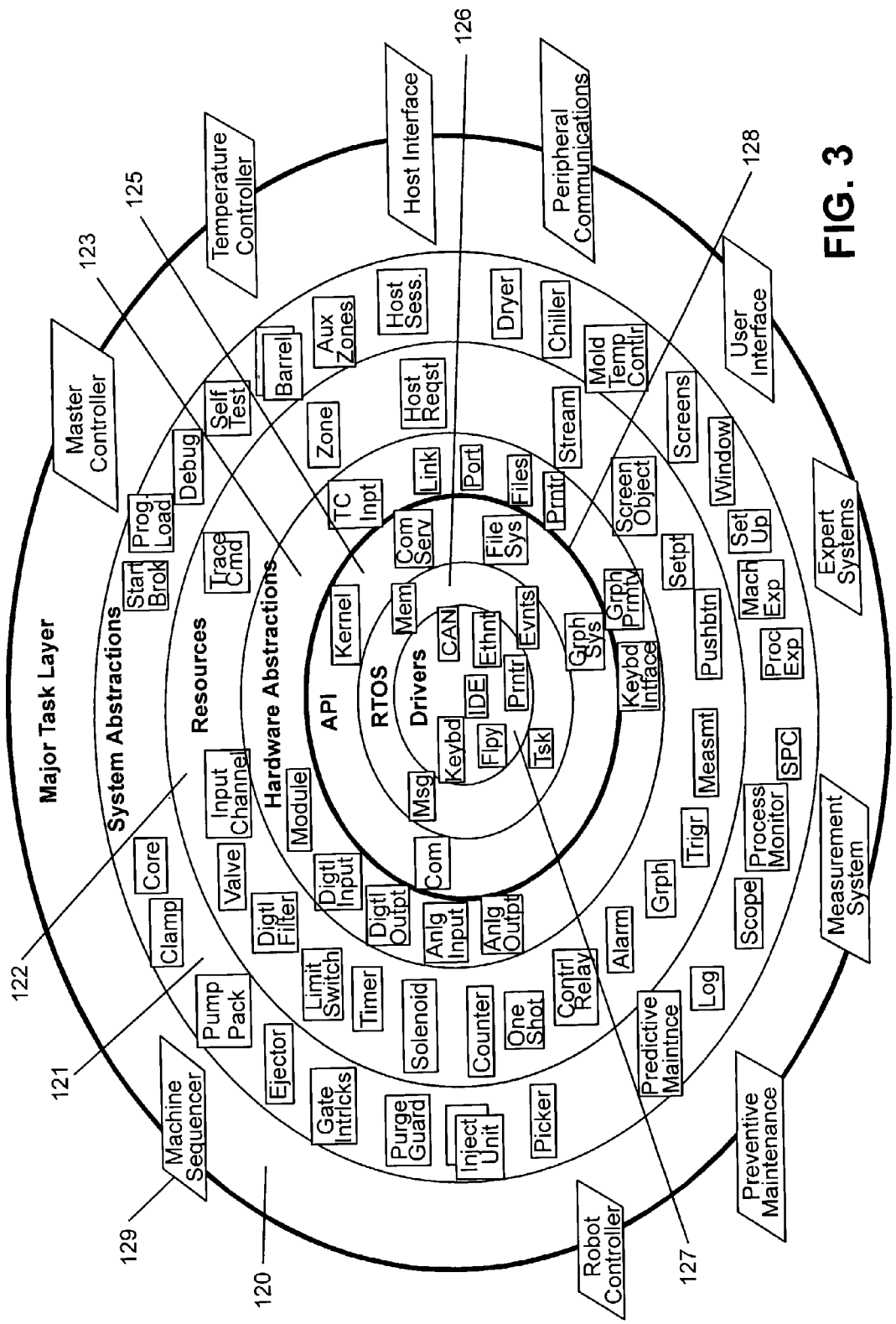
FIG. 3 is an onion skin or tree ring diagram indicating generally the structure of the inventive system.

Referring now to FIG. 3, there is shown another context diagram in an onion skin form illustrating system abstractions in layer form. This diagram does not show the flow of information present in the context diagram of FIG. 2. It is primarily inserted to show the class abstraction layers present in the control system with the general understanding that communication usually occurs between adjacent layers. However, FIG. 3 is not a class diagram. The layers or skins generally illustrate the abstraction levels of classes and procedures processed by the control system. That is, the control law implemented by the machine's programmed routine performs the functions of the major systems shown in the major task layer 120 which, in turn, use a number of system abstractions 121 that, in turn, employ resources 122 and hardware abstractions 123. For example, the control law will implement a machine sequence which, in turn, will actuate, for example, the clamp, injection unit, ejector, etc. Those components, in turn, will actuate components therein such as valves, limit switches, timers, etc. and receive as input and transmit as output, i.e., I/O, to the application program interface layer 125. Specifically, machine sequencer 129 will cause implementation of the machine cycle in accordance with a machine control law which will implement the cycle in its interdependent relationship. Because the machine cycle, in its abstract form, must be performed on every injection molding machine, machine sequencer 129 and its general control law is common to all injection molding machines. The components actuated by the machine sequencer perform their own functions pursuant to control laws specific to their function. The control laws used in this invention are not specifically set forth herein since those skilled in the art know their function, have developed their own specific control laws, and the invention is not limited to any specific control law. Reference can be had to my U.S. Pat. No. 5,997,778, dated Dec. 7, 1999, entitled "Auto-Tuned, Adaptive Process Controlled, Injection Molding Machine" and U.S. Pat. No. 5,513,115, dated Apr. 30, 1996, entitled "Clamp Control for Injection Molding Machine" for examples of specific control laws suitable for use in this invention. More particularly, reference can be had to my U.S. patent application Ser. No. 09/967,731, filed Sep. 29, 2001, entitled "Model Predictive Control Apparatus and Methods for Motion and/or Pressure Control of Injection Molding Machines," of which this application is a continuation-in-part incorporated by reference herein for its disclosure of the control laws set forth therein and implemented therein which is to be understood as being utilized herein in a preferred embodiment of this invention.

Generally, the inner layer indicated by the heavy ellipse 128 (including the API layer 125, the real time operating system layer 126 and the driver layer 127) is composed of low level procedural code acted on by the system microprocessor to generate command signals through drivers. The invention can be viewed as the layers 120, 121, 122 and 123 outside inner ellipse 128 and are programmed using object orientation methodology. Inner ellipse 128 may or may not use, wholly or partially, OO techniques. Communication with RTOS layer 126 is not limited to the hardware abstraction layer 123. The API can be viewed as running underneath resource layer 123 (for example, communication between API and some timers can occur) and even underneath the system abstraction layer 121 (for example, certain elements in the pump package can communicate with API layer).

Figure 4A:
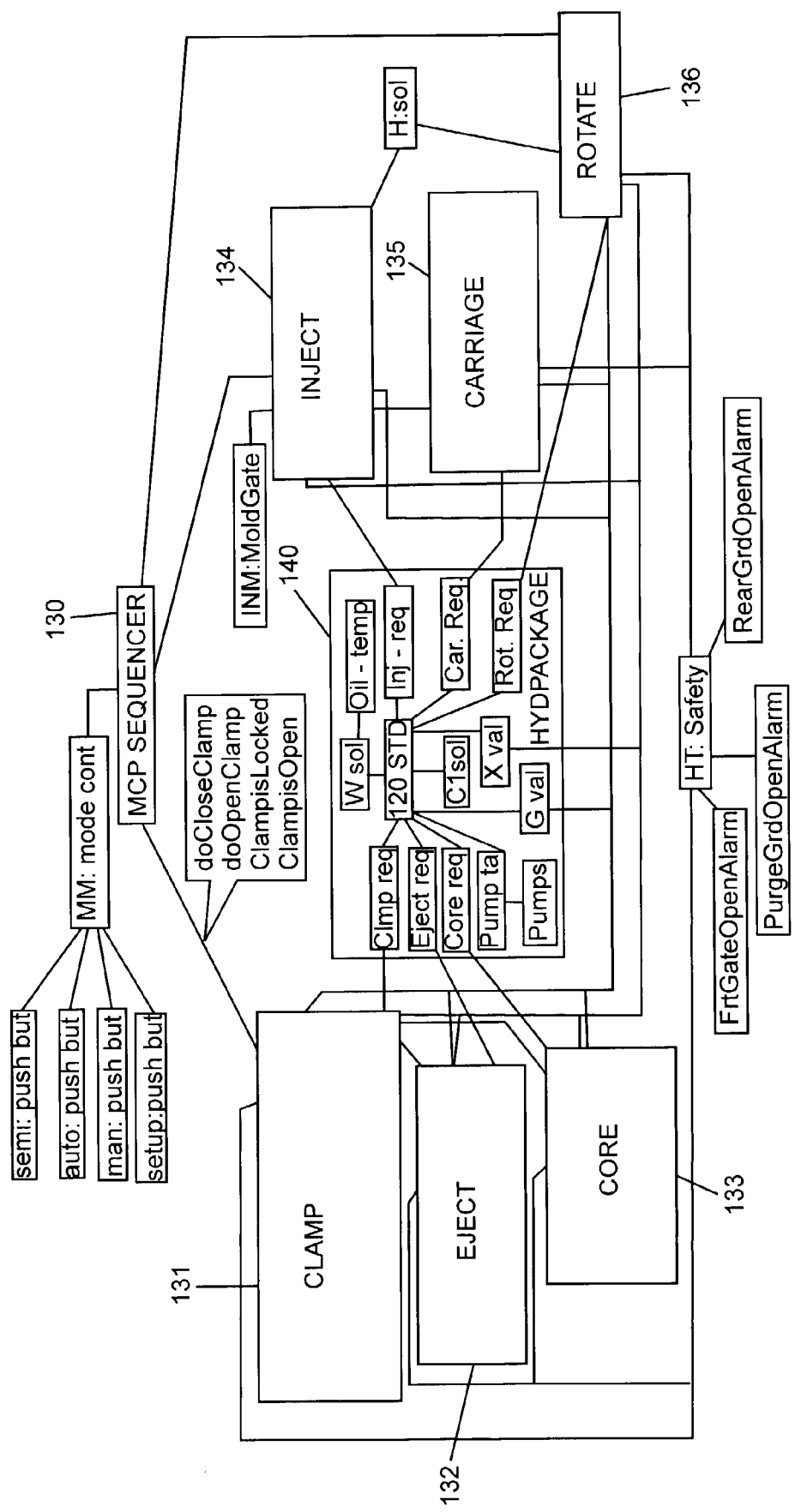
FIG. 4A is a collaboration diagram of the system of the present invention.
Figure 4B:
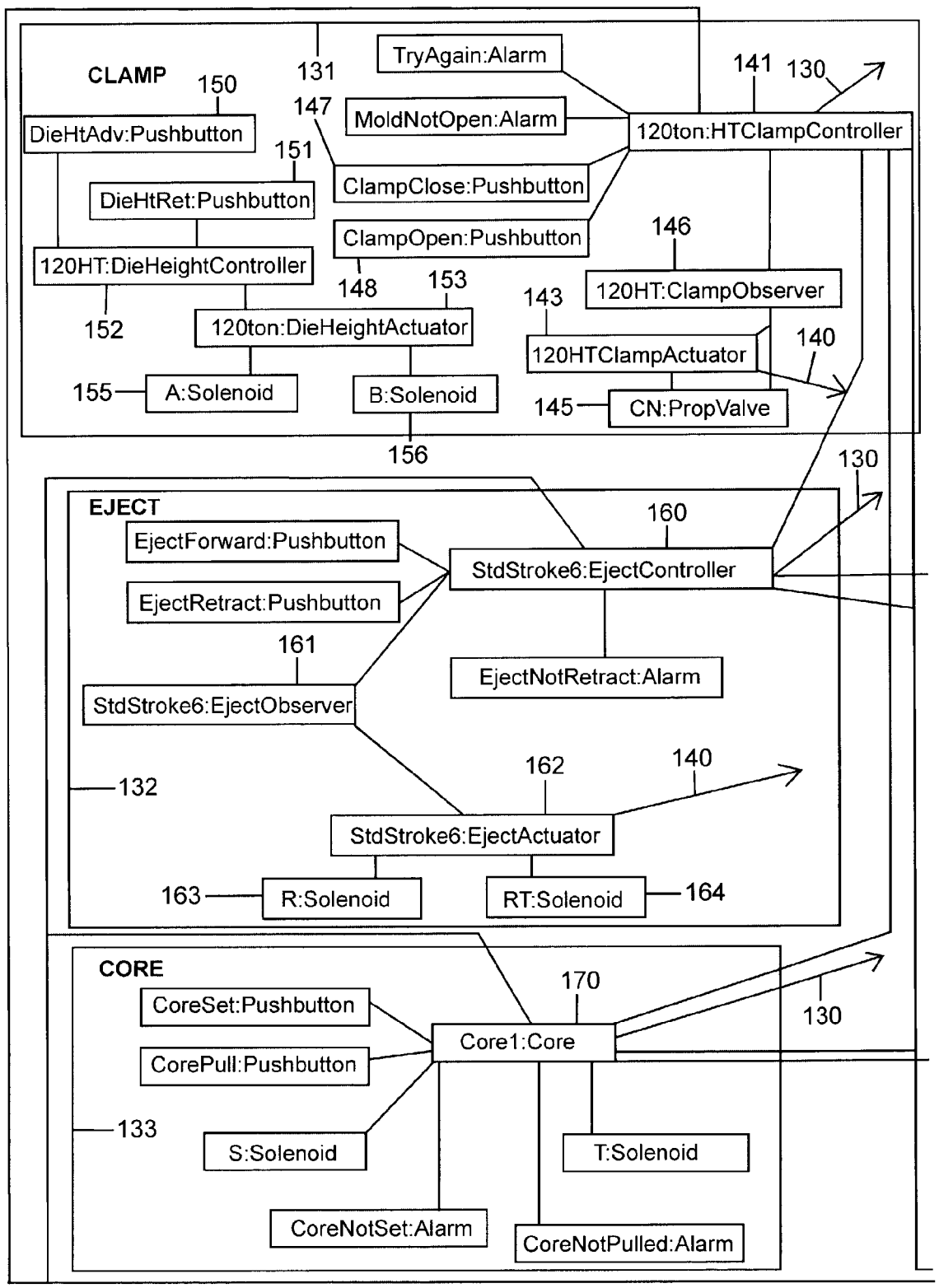
FIG. 4B is a collaboration diagram of the clamp, eject and core components shown in FIG. 4A.
Figure 4C:
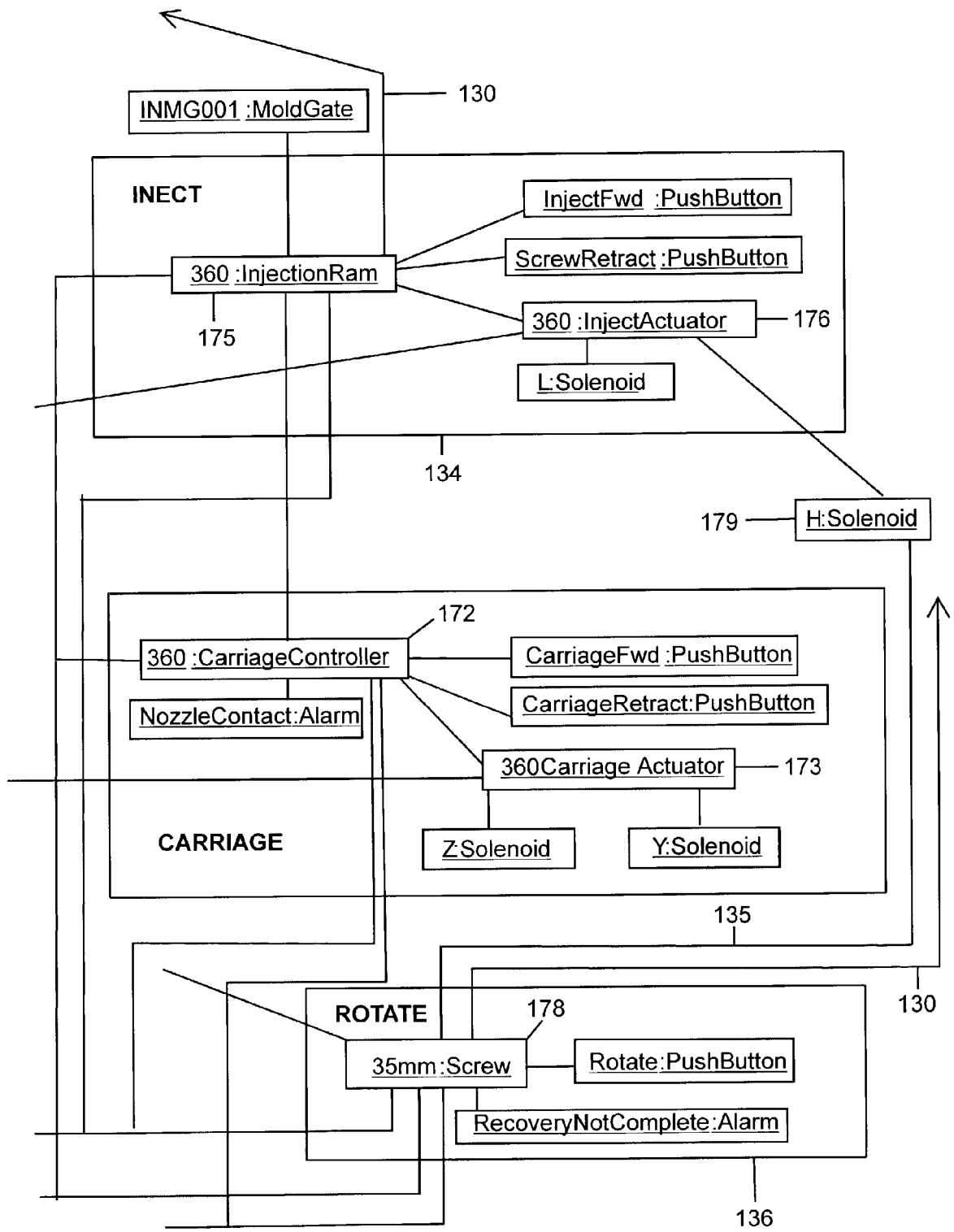
FIG. 4C is a collaboration diagram of the inject, carriage and rotate components shown in FIG. 4A.

FIGS. 4A, 4B and 4C show, in general, the collaboration diagram for the machine's control and is a better representation of the overall system than the onion skin of FIG. 3. Specifically, FIGS. 4B, 4C shows the communication between the components within a group of components and communication across groups of components. In FIG. 4A, a sequencer master control program 130 motivates other program components shown as blocks containing clamp components 131, eject components 132, core components 133, inject components 134, carriage components 135 and rotate components 136. In addition, because the FIG. 4A embodiment is directed to a hydraulically powered injection molding machine, there is a hydraulic package of components 140. Generally, sequence program 130 sends instructions to the programmed routines running in the block components 131–136 which, in turn, motivates the programmed routine in hydraulic package 140 to, in turn, run a programmed routine resulting in movement of hydraulic valves and the like on the machine to produce the desired machine action. For example, sequencer 130 sends instructions to the block of clamp components 131 such as "do close clamp." The basic program components for clamp 131 are shown in FIG. 4B. The components include a clamp controller 141 shown receiving instructions from sequencer 130, a clamp observer 142 and a clamp actuator 143. The relationship between controller-observer-actuator will be discussed further with respect to FIGS. 5 and 7 below. For the collaboration diagram discussion it should be sufficient to note that clamp actuator generates instruction to a clamp valve routine 145 and to the clamp request program block of hydraulic package 140. That is, in response to the "do close clamp" instruction of sequencer 130, actuator 143 will perform a program routine causing clamp valve 145 to open and close over a timed interval such that the clamp closes initially fast, then slow and then locks-up. The hydraulic package instruction assures that the pumps generate fluid flow and pressure sufficient to permit the clamp valve to operate. Because the machine must allow for operator intervention to manually open and close the mold halves, program routines are developed for clamp pushbutton close 147 and clamp pushbutton open 148.

Clamp block 131 is also shown to contain the components for adjusting the die height (height of mold halves) which, in this embodiment, are set by the machine operator actuating pushbuttons causing advance and retract program routines 150, 151, respectively, to operate. This, in turn, causes die height controller and die height actuator 152, 153, respectively, to produce commands controlling A and B height solenoids 155, 156. Solenoids 155, 156 control vertical position of the mold halves. Note an observer is not utilized for die height. However, if an automated die height was required, an observer would probably be employed.

A similar arrangement is used for eject component block 132 in that sequencer 130 sends commands to eject controller 160 which, in turn, works with an eject observer 161 and an eject actuator 162. Eject actuator controlling solenoids 163, 164, in turn, controlling movement of ejector pins pushing the molded part off a mold half after mold separation. Extension and retraction of the ejector pins follows a programmed routine such as increasing travel at timed cycles. Note the communication between clamp controller 141 and eject controller 160 assuring proper state transitions.

It is preferred that the block components utilize the triad of controller-observer-actuator to allow the machine to function automatically with a minimum number of external sensors. However, in accordance with the broader scope of the invention, the control system does not require the triad for each machine component block. Thus, in core setting component block 135 a core programmed routine 170 performs the function although tied to clamp controller 141 and eject controller 160.

On the injection side of FIG. 4A collaboration diagram, as shown in FIG. 4C, carriage component block 135 employs a carriage controller routine 172 and a carriage actuator component routine 173. For the inject component block an injection ram routine 175 is associated with an injector actuator 176 controlling screw translation. In the screw rotate component block 136, screw program component block 178 controls a solenoid program component 179 controlling rotation of the screw during recover and also during injection.

Referring now to FIG. 5, there is shown a toggle clamp class 180 in broken line which is the child of a parent linear actuator class 181. Toggle clamp class 180 includes an observer class 183, a clamp controller class, 184 and an actuator class 185. For discussion purposes, an I/O device 186 is shown for inputting sensor signals at 187 from the machine to observer 183 and outputting command signals at 188 to actuators on the machine. Reference may be had to my co-pending application Ser. No. 09/968,357 entitled "Melt Pressure Observer for Electric Injection Molding Machine" for a more detailed discussion of the control law and the equations used therein by classes 183, 184, 185 than that set forth herein. This invention is a continuation-in-part my '357 application which is incorporated by reference herein for such disclosure. Generally speaking, observer 183 contains a model based on a number of equations which use sensor signal data to develop variables or data indicative of the current state of the toggle clamp. This current state is sent to actuator class 185 which can be viewed as containing the control law which, in turn, generates control output valves or command signals sent to I/O device 186. The current values of observer 183, if determined to be beyond a set value at limit switch 190, are also sent to clamp controller 184 which is a state machine and performs a number of equations to determine, in advance, when a change in state is to occur, i.e., from fast close to slow close. The state transition is inputted into the control law of the actuator class to generate command signals in advance of the event to account for response latency, jigger, etc. It is a particular advantage that the model built as an object oriented program in the observer can use less sensor data than currently required to generate command signals. More importantly, for this invention, the observer for the different components described in FIG. 5, while employing different variables, can nevertheless be readily constructed using object oriented techniques of encapsulation, polymorphism and inheritance.

While FIGS. 4A, 4B, 4C show the collaboration of the machine components, FIGS. 6A and 6B form a machine control class diagram and better show the relationship between the main classes which act to control the molding machine operation. It is drawn in the class diagram notation of the Unified Modeling Language ("UML"). In this notation, classes are shown as rectangles and relationships between classes are shown as lines. The three main types of relationship shown in the included UML diagrams are a) inheritance indicated by a line ending with a triangle pointing to the parent, b) a bi-directional association indicated by a line or a unidirectional association in the direction of a line with an arrow at one end, and c) an aggregation or inclusion indicated by a line with a diamond at the end near the "owner" or "outer" object. The numbers at the end of each relationship line denote the number of objects that participate in the relationship at each end. An asterisk, *, is an indicator for "unspecified but greater than or equal to 0".

In FIGS. 6A, 6B, there is shown a variety of classes collaborating to accomplish the machine control. Classes here are arranged in a way that bears a strong correlation to the arrangement of physical components that the program is controlling resulting in an efficient, logical, and easy to understand structure. For instance classes are present corresponding to the clamp, the ejectors, the die height, the carriage, and the injection unit including the temperature control. There are also classes corresponding to lower level hydraulic and mechanical components such as valves, limit switches, the keyboard and associated buttons, the pumping package, and input and outputs points and cards. At the center of the diagram is a single instance of the MCP class 201.

MCP (Master Control Program) class 201 controls the sequencing of machine actions. It communicates with objects of the pushbutton class 202 through the shown association 203. All instances of pushbutton class 202 are connected to a single instance of the keyboard class 204 through links 205. The keyboard class performs the interface to the hardware to read events and map them to states in the associated pushbutton class 202. MCP 201 also receives input from a machine mode object 206 through its association 207 to determine if the machine is in semi, auto, or manual cycle mode. The MCP uses the above input to determine what action or machine function is required. It does this using a state machine but other types of programming logic could be used here. Later, in examining the internal structure of some of the classes, the details of the implementation in the preferred embodiment of an expandable state machine suitable for use in OOP (Object Oriented Programming) is described.

The MCP, having determined what action or function is desired, enters an internal state corresponding to that action and commands the action to occur by passing a message along an association to a controller subclass such as the eject controller 208 via association 209, the clamp controller 210 through link 211, the die height controller 212 through link 213, the carriage controller 214 through link 215 or the inject controller 216 through association 217. These actions may occur simultaneously or in sequence as is dictated by the state machine logic of MCP 201. Each controller such as the clamp controller 210 then determines, using its own parallel running state machine, what particular sequence of sub-functions are determined to accomplish the commanded function from the MCP. For the case of clamp controller 210 this might involve the determination that to close the clamp as commanded along link 211 from MCP 201 the machine must go through a series of sub-states such as close fast, followed by close slow, followed by lockup functions. The controller then sends these generic function commands to the associated actuators whose responsibility it is to cause outputs to be sent and inputs monitored in order to accomplish the desired functions. Clamp controller 210, for instance, sends these commands to a clamp actuator 218 along link 219. A controller, such as injection controller 216, may also detect a scenario where it is not able to perform the desired command and then post an alarm to an alarm central object 220, light an alarm light 222 using link 224 from injection controller 216 or link 226 from a temp controller 227, or sound alarm bell 221 using links 223 or 225 from respective controllers 216 and 227. Some controllers such as eject controller 208 may read from associated components such as clamp actuator 218 via association 228 or from the clamp observer 229 via association 230 in order to determine what function to execute. For drawing clarity not all associations or links for all components are shown. For example, the alarm communications with all controllers is not shown. However, a sufficient number of associations and links are illustrated to understand the relationship between, and functioning of, the classes depicted, and particularly, all associations necessary to perform the machine cycle are shown.

Each controller typically has an association to an actuator for the same function. In addition to the clamp described above, eject controller 208 contains link 231 to eject actuator 233. Die height controller 212 contains link 235 to die height actuator 236. Carriage controller 214 follows link 237 to carriage actuator 238, and inject controller 216 has link 239 to inject actuator 240. In each case, the controller determines the sequence of functions necessary to accomplish the command from MCP 201 and then sends a series of commands to the actuators to accomplish these functions.

The actuators then calculate the outputs required to accomplish the functions commanded by the controllers and output the calculated values to the valve class 243 for analog outputs or to the SHO (software to hardware output) class 272 for digital outputs. This is shown in associations 234, 245, 245A, and 247 from actuators 233, 218, 236, and 240 respectively for valve class 243 and associations 253, 254, and 255 from actuators 218, 236, and 238, respectively, for SHO class 272 as well as direct connections to SHO class 272 from temperature controller 227 and a pumping package 267 along links 256 and 281, respectively. Actuators may also communicate with pumping package 267 through use of a pump request class 251 in order to arbitrate various requests for the control of the pumps. Pump request class 251 is, for instance, used through links 248, 249, and 250, communicating with eject actuator 233, clamp actuator 218 and inject actuator 240, respectively, which then communicates to the pumping package along link 266. One additional function of actuators is to monitor inputs calculated by the observers and compare this to limit switch positions as represented by limit switch class 257. Specifically, actuators 236, and 238 monitor limit switches of class 257 through links 259 and 260, respectively. MCP 201 also monitors certain position statuses through link 261 to limit switch class 257. These input limit switches may also receive digital inputs from the input point SHI (software to hardware input) 264 through link 265.

Observers access analog inputs through an analog input/output card 268 class along links 270, 271, and 242 for clamp observer class 229, eject observer class 230 and injector observer class 241, respectively. Also accessing input/output card 268 are valve class 243 through link 269, the SHO 272 through link 283 and digital input points SHI 264 through link 273. Data from observers such as the eject observer 230, clamp observer 229, and injection observer 241 are read from actuators 233, 218, 240, respectively, along links 232, 282, and 284 respectively. The observers typically filter and scale the data, sometimes using constants and equations of motion to estimate various internal states of the machine being controlled. This information is made available to the actuator for controlling the motion using closed loop algorithms encapsulated in the actuator. The internal structure of the observers is described more in FIG. 7.

The actuators may themselves be monitored by the process monitor system 274 along links 275, 276, 277, 278 and 279 connecting inject actuation 240, MCP 201, eject actuator 233, clamp actuator 218 and temperature controller 227, respectively. This data may, in turn, be stored and summarized by production monitor system 280 via link 285 The production monitor system also monitors the overall machine state of the MCP 201 along link 286 for production data recording.

FIG. 7 is a class diagram of the internal structure and parent child relationships involved in a typical controller, actuator, and observer triad. This demonstrates how the arrangement of classes described in the machine control class diagram FIGS. 6A and 6B use the object oriented principles of encapsulation, polymorphism, data abstraction, and inheritance to accomplish programming by difference of injection molding machines in order to specialize a particular machine type. In this figure the internal structures of the clamp controller, actuator, and observer are described.

In FIG. 7, new reference numerals are used to describe the classes even though the classes have been shown in the discussion of FIGS. 6A and 6B. Clamp controller 299 is seen to include instances of the state class 300, transitions 301, and compartments 303 as well as alarms 304, timers 305 and an item of state trace 302 which is used to record what states the controller has been executing in. The state 300, transition 301 and compartment 303 classes are used to program a state machine which may be extended by inheritance. In this pattern, an entry, activity, and exit method may be associated with each state object. The state class also contains internal properties for whether it is currently active and for how long the controller has been executing in a given state. The state entry, activity, and exit methods may be programmed as methods in the clamp controller class and then a handle to the method is stored in the state class in order to call the method. This is required since typically each state object has different methods to be called for their activity, entry, and exit methods. The transition class contains a handle to another method in the controller which is used to evaluate whether a change in state should occur. In this way, new transition objects may be added which may cause state changes to more specialized states. States may also be grouped into compartments 303 for parallel or concurrent states. Within a compartment there will also be one and only one top-level state active. Sub-states may be defined by specifying a super-state such as through association 307. When a state is active, then one and only one sub-state will also be active if sub-states are defined for the given state.

The inheritance relation shown as link 308 indicates that the linear controller 306 is the base, or parent class for the clamp controller 299. This is an example of how a class may be specialized for a given function or context and still make use of all the functionality and attributes of the more general class. For instance, the more general linear controller 306 itself includes states 300, transitions 301 and compartments 303. With these classes the linear controller 306 constructs a state machine for execution of logic common to all linear controllers. In this case, that logic corresponds to states for moving forward, moving in reverse, stopping due to normal completion, and stopping due to an interruption. These operations are common to all controllers and by defining them in the parent class 306 they may be re-used by any derived class, thereby improving programming productivity, quality, and reducing errors. The derived class 299 may then specialize the behavior, such as adding sub-states for closing fast, closing slow, and locking up as described above. The methods defining these states are programmed in the derived clamp controller class 299 and connected using state to state relationships like 307 or state to compartment links such as 344. It can be seen that since the state class 300 is aggregated by both the derived class 299 and the base class 306, states from the derived class will frequently contain links to states from the base class and this is, for instance, how the sub-states for closing fast, closing slow, and lockup up, are related to the more general state of moving forward in the base class, thereby causing the specialized behavior to be activated when the more general function of moving forward is called on.

Clamp controller 299, having processed inputs according its programmed state machine, enters a state where a function is desired to be performed. This results in clamp controller 299 sending a command to a specialized clamp actuator such as the EL (electric) clamp actuator 318 along link 319. The EL clamp actuator being derived from a clamp actuator is considered to be of the same "type" as a clamp actuator and therefore compatible in all cases where a clamp actuator is required. In this case it can be seen that the EL clamp actuator 319 is derived from a base clamp actuator 322 through the parent link 309.

The EL clamp actuator is shown to include switch positions 310 related via link 312 to embedded switches 311 to determine certain actuator specific modes of operations (on/off for instance), limit switches 313, and analog output classes such as the move class 314 which activates output ramps 316 via link 318 and position or time profiles 315 along links such as 319. The profiles 315 and ramps 316, when activated by their associated move objects 314, assert their desired profile to an object of the motion class 317 along links 320 and 321. The motion class 317 encapsulates data for each axis of motion such as clamp closing and clamp opening, and performs the advanced closed loop control algorithms to achieve the desired ramp 316 or profile 315.

The actuator also demonstrates how the code can be specialized for various machines types. In the figure the included objects may be aggregated from both the base clamp actuator class 322 as well as the derived clamp actuator class 318. Thus the moves, ramps, profiles, motions, switches, and switch positions common to all types of clamp actuators may be embedded in the base class and thereby made available. Any behaviors which are specific to the electric machine's clamp may then be placed in the derived class, connecting ramps and profiles to existing moves 314 or adding behavior by added methods to the EL clamp actuator 318. The methods defined in 318 may also have the same name as those in the base clamp but effect different behavior thus demonstrating the use of polymorphism.

The actuator (derived and base) also compares current and predicted positions, pressures, and other analog inputs against setpoints and store the status of these comparisons in limit switch structures 313. These input values are also used in the execution of the control loops in the motion class 317 for instance. To access these calculated position values, the actuator references a machine variation specific observer such as the EL clamp observer 329 via link 342.

The El clamp observer 329, derived from a base clamp observer 340 which is itself derived from a base observer class 323, performs the reading, filtering, and scaling of the data. To accomplish this an embedded network of Csensor class objects 324 and variations of the filter class 327 is used. The Csensor class 324 access the hardware I/O cards directly to read data from an A/D and perform some scaling operations according to data attributes such as offset and sensor span voltages. This converts the binary data from the A/D to a real number representing an actual speed or pressure reading from a sensing device. Classes representing digital filters are then connected to the Csensor class 324 such as a Cfilter velocity class 325 via a link such as 330 or an approaching filter 326 which uses a velocity filter 325 as shown by aggregation 341 to predict future positions or pressures. The filters may be arranged in networks with the output of a velocity filter 325 connected to an additional velocity filter as shown by the self-link 328 in order to twice differentiate a signal thus calculating acceleration. The base observer class 323 may contribute some necessary utility functions with most of the filtering and input done in the derived clamp observer class 340 and then more specialized with additional sensors 324 and filters 325 and 326 as required for specific machine variations. Observers may also calculate values directly in their methods based on readings from sensor 324 or filters 325 or 326.

In the FIG. 7 embodiment, illustrated clamp controller 299 is in relationship with clamp actuator 318 and clamp actuator 318 is in relationship with clamp observer 329. Information from clamp observer 329 is used by clamp actuator 318 to, among other things, set switch classes, principally limit switch class 313. Switch class information is used by clamp controller 299 to set states and trigger state transition commands to clamp actuator 318. Switch states are a convenient mechanism to utilize current machine data for actuation in the current state as well as providing the necessary information to clamp controller 299 to allow state transition. Alternatively, clamp observer 329 could be in relationship with both clamp controller and clamp actuator.

FIG. 8 is an illustration of how the above described classes and objects of those classes may be arranged into libraries and components in order to assemble objects to produce software for specific machines. FIG. 9 is an expanded view of the class library shown in FIG. 8. In FIG. 8, the machine project 450 represents a network of objects which can be compiled to a machine executable form in order to control an injection molding machine. In this machine project 450, all objects are defined as are all associations between objects. Any initialized object data is also present in this final, composite, machine program. Different machine projects for different machines are shown collectively as 453. In FIG. 8, a series of 18 machines are to be produced and the specific machines may be designated 453A through 453R. Machines 453A through 453D are identical. Machines 453E through 453J are different than machines in the first group (453A–D) and are identical except that machine 453J is a variant within the second group.

Associated with each Machine project is a collection of usage relationships. The collection itself is shown as 451, and the one to one association of the machine project to the collection is shown as 452. This set of relationships associates all constituent parts of the machine project with a corresponding source part in a library of reusable objects and classes either directly or indirectly as described below. This collection 452 is unique to the particular machine and its machine project 450 and serves as a recipe for how to assemble the machine network 450.

In order to facilitate serial machine production and productivity in assembling the components, usage relationships may be grouped into packages referred to as subsystems. This allows for referencing the usage of multiple components with a single reference to the subsystem. Likewise, subsystems may be grouped into a commonly referenced configurations referred to as a machine variant such as indicated by reference numeral 454 in the component library. Thus, a particular machine usage collection 451 for a particular machine, such as an 80 ton election machine with an 8 oz injection unit program 450, may include a single reference to an 80 ton/8 oz IntElect™ machine variant usage collection 454 which lists all standard used subsystems in this configuration. This may include a usage relationship to an 8 oz injection unit as is diagramed by link 461 to an 8 oz. injection unit subsystem 459 or link 460 to an 80 ton electric clamp subsystem 458.

The subsystems such as the 80 ton electric clamp 458 may then directly reference usages to particular source networks of objects called primitive components such as a clamp controller network 456 with usage relationship 457 and an EL clamp network 464 with usage relationship 465. It is through this inclusion of a combination of standard common clamp components for all machines such as the clamp controller network 456 with the more specialized component of an EL clamp network 464 that many different machine types may be constructed from a set of reusable components. This pattern is repeated in many different subsystems, where all common objects are stored in reusable base components, and the components which need to be specialized for certain machine types, frequently the actuators and observers for instance, may the be grouped into specialized components (which are derived from more general classes thereby inheriting the more general behavior and thus facilitating reuse even in the specialized cases).

The object networks, both common and specialized, contain parameterized instances of objects including relationships to other objects and links to all classes used in the network. The clamp controller network 456, for instance, contains all the parameters for an instance of the clamp controller class 210 and for all embedded objects aggregated by the clamp controller class 210 described in FIGS. 7A, 7B. The connection of the clamp controller class 210 to an instance of a particular clamp actuator as shown earlier as link 219 is also included in this network 456. This link is by object name, to an object of a class derived from a clamp actuator. The name of a particular variant of a clamp actuator such as "The Clamp" for the EL clamp actuator 218 may be used allowing the clamp controller 210 to remain generic, and still connect to a specialized El clamp actuator 218. Any other specialization of clamp actuators 322 (FIG. 8) such as hydraulic or vertical clamps need only use the same name for its specialized clamp (i.e., "The Clamp"). The clamp controller network 456 also contains usage relationships to all classes used such as the clamp controller class 210 as well as the code for all embedded classes such as states 300, transitions 301, and compartments 303 (FIG. 8).

The class definitions of items such as the clamp controller 299, as well as it's base class the linear controller 306 and other controllers such as the eject controller 208, are grouped into collections of classes as shown by the dotted line boxes 466. The classes contain numerous associations between each other as described in the previous FIGS. 6A, 6B and 7. These collections of grouped classed are collectively referred to as the class library and contain all source code and definitions for the classes.

FIG. 10 is a general parent/child class diagram showing how the system model builds the system in parent/child hierarchical methodology. The parent/child hierarchy through several generations is shown for the clamp. Note that one of the clamps shown, the EL clamp, for example, is a clamp used in an electric machine and was described in detail in FIG. 7. It has to be also appreciated, that each of the specific classes shown has a multi-level parent/child relationship built by the system which descends down to the level which contains actual hardware items controlling the clamp, such as timers, counters etc.

The ultimate parent shown in FIG. 9 is a linear actuator class 500. Functionally, all linear actuators travel in a straight line and go forward and reverse. As described in FIG. 7, linear actuators are state machines and have a controller and an actuator as described above. The children of linear actuators are shown in the next descendant row and include clamp class 501, inject unit class 502 and eject unit class 503. Also in the row can be die height class, carriage class and core set class, which are not shown. This row comprises the main classes of the machine necessary to accomplish the machine cycle. Discussion will center on main clamp class 501 and its children. Main clamp class 501 inherits the state machine of linear actuator class 500 including behaviors of start, stop, move forward, move reverse and basic encapsulated data such as a switch to stop and start. Clamp class 501 can additionally include an observer and additional behavior such as start forward meaning start fast, then slow and lock up. Encapsulated data can include a moving platen and a stationary platen, links to other main classes, some sensor data, etc. While main clamp class 501 contains structure, data relationships and behavior common to all clamps, there are several different clamps from a hardware analysis shown in the child row descending from main clamp class 501. These child clamps include vertically oriented clamp 507, a toggle clamp 508 and a hydraulically actuated clamp 509. Each of the child clamps include all hardware, data, and behavior attributes of the main clamp class 501 and have additional hardware, data and behavioral characteristics specific to their identity in the child class. For example, toggle clamp class 508 uses a pivot arrangement which, when reached, snaps the clamp in to a lock-up position. Hence, the lock-up condition inherited from main clamp class 501 requires different sensors than does hydraulic clamp class 509 when lock-up is determined as a function of the pressure of the hydraulic fluid exerted on the clamp piston which are, in turn, specific hardware, data and behavior characteristics common to any hydraulic clamp. The children of toggle clamp 508 (grandchildren of main clamp class 501) are shown to include EL (electric) clamp class 299 (described above), four point hydraulic toggle clamp class 510 and five point toggle clamp class 511. Electric clamp class 299 and HT four point hydraulic clamp class 510 possess all the data, hardware and behavior of toggle clamp class 508 and all are set to determine lock-up at the point where the toggle linkage snaps the clamp into a lock-up state. However, electric clamp class 299 has to add hardware related to electric motors, response time of the motors, etc., while the HT clamp class has to add pumps, valves, etc., into its hardware and data description, in turn, requiring different sensors, etc. In practice, the tree of FIG. 9 extends much further than shown. For example, clamp is sized to the capacity of the machine. Eventually, a sub-class for EL clamp class 299 will emerge where a clamp design for a machine having a capacity to inject a certain shot size is specified. This sub-class has the programmed routine capable of implementing that portion of the sequence control law when called upon by the machine sequencer class. As shown in FIG. 9, and demonstrated perhaps more clearly in FIG. 8, inheritance allows for the programmed routine to be "specified by difference" rather than from scratch each time. In standard structural methods, extending or specializing a function requires modification of the source code to produce a new routine that satisfies the specialized function. In OO methodology, a sub-class is created that merely adds the additional attributed and behaviors needed. The code is not modified, but simply extended with the additional modifications. Further, if a behavior needs to be implemented differently for a sub-class, the sub-class can simply redefine the behavior. This is one of the factors distinguishing inheritance from aggregation. For example, if a measurement is specified in centimeters for the behavior in a parent class, and the sub-class requires millimeters, the behavior for the sub-class measurement can be redefined in the sub-class.

As noted above, each of the clamp classes in the three parent-child layers of FIG. 10 have their own controller-observer-actuator classes but the constituents of those classes becomes more detailed or sophisticated as the hierarchy is descended. Insofar as the discussion of FIG. 8 is concerned, vertical, toggle clamp and hydraulic classes 507, 508, 509 as well as EL clamp, HT and 5-point toggle classes, 299, 510, 511 would be listed as primitive components in the component library. If an order came in for a particular type of EL clamp, and depending on the changes, a child of the EL clamp could be constructed and added to the primitive library collection or EL clamp class 299 could be assembled with the other classes needed for that machine in the subsystem collection and the changes made in the machine variants collection. For example, if only the stroke were changed, the stroke limitation would be added as a machine variant because the functioning of the classes already programmed could simply add that data into existing classes.

The hierarchal relationship may be better appreciated by looking at the code for the various classes as they descend into the child relationship. The code set out below, while functional, is a simplified, stripped down version of the clamp code for the actuator class actually used in the preferred embodiment.

The class code for parent linear actuator class 500 is:

```
FUNCTION VIRTUAL GLOBAL LinearActuator::MoveForward()
{
    // Any actuator can be stopped by setting the inhibit input true
    if Inhibit.read() = TRUE
    then
        AlmInhibited.activate.write( TRUE);    // Set inhibited alarm
    Endif;
}
```

The class code for clamp class 501 is:

```
FUNCTION VIRUTAL GLOBAL Clamp::MoveForward()
{
    // Check for conditions common to all clamps
    LinearActuator::MoveForward();    // Call parent class
    If Gate.Closed.read() = FALSE    // all clamps must check gate
    Then
        AlmGateOpen.activate.write( TRUE);    // set gate open alarm
    End_if;
}
```

The class code for toggle clamp class 508 is:

```
FUNCTION VIRTUAL GLOBAL ToggleClamp::MoveForward()
{
    // Close clamp according to toggle clamp method
    Clamp::MoveForward();    // Call parent class
    If not AlarmCentral.active()    // Check for alarms
    Then
        If LSCloseFast.at() then ClampActuator.CloseFast()
        Else_if LSCloseSlow.at() then Clamp Actuator.CloseSlow()
        Else ClampActuator.Lockup()
    End_if;
}
```

The class code for EL clamp class 299 is:

```
FUNCTION VIRTUAL GLOBAL ELClamp::MoveForward()
{
    ToggleClamp::MoveForward();      // Call parent class
    MotorDrive.enable();
}
```

EL clamp class 299 is the class inserted into the program. EL clamp class has, in addition to specific code for performing a move by an electric motor, a coded instruction to "call parent class" which is toggle clamp class 508 having its own code and in addition a coded instruction to call the code of clamp class 501 which in turn contains instructions to call the code of linear actuator class 500. Thus, EL clamp class 299 has not only its own specific code but also all the code of its parent classes, 508, 501 and 500 and illustrates how a specific actuator in the machine can be built using inheritance by difference concepts.

It must be also noted that the machine cycle has been explained above as being performed through the relationship of the classes discussed as classes defining attributes and controlling behavior of identifiable machine hardware performing the defined cycle steps. Because each cycle step has identifiable hardware, each hardware "item" can be conceptually programmed as a stand alone controller so long as its attributes and behavior affecting all other hardware items is taken into account. To a significant extent, this Detailed Description describes the invention in this context. However, the injection molding machine has additional hardware that is affected by each of the major cycle classes discussed above. For example there is hydraulic package 140 discussed with reference to FIG. 4A for a hydraulic machine and there is barrel temperature controller 227 discussed with reference to FIG. 6B. As explained, in a hydraulic machine the clamp control class will produce clamp control objects regulating a proportioning valve controlling platen motion of the clamp and hydraulic package will key in any number of pump systems so that sufficient fluid flow and pressure is available for the proportioning valve to adequately function. The barrel temperature controller will regulate the heater bands to assure proper melt temperature during inject. The temperature controller and hydraulic package are preferably programmed as separate classes (receiving instructions and data from the cycle classes defined above) as shown. Alternatively, the items could be implemented as constituent parts of the major cycle classes. Similarly, third party equipment (such as robotic core setting equipment or robotic mold removal equipment), as shown in FIG. 2 (which have their own legacy software) are preferably programmed as simple run objects comprising a constituent class in one of the major cycle classes described above. However, they could be programmed as a stand alone class similar to temperature controller. Therefore it is to be understood that the cycle classes defined above do not comprise all the classes used by the machine in a machine cycle but are major classes. At the same time it is also recognized that a molding machine program could be developed where the machine cycle classes defined above comprised only and all of the parent classes. Similarly, some of the cycle classes defined above could be combined into a master class. For example, rotate could be combined with the inject class. However, such a combined rotate/inject class, in actuality is the equivalent of the separate rotate and inject classes discussed above. Thus, the invention disclosed herein when defining the cycle classes such as inject, eject, etc. include combinations of such classes performing functions associated therewith and do not preclude additional major classes used by the machine when performing a molding cycle.

The invention has been described with reference to a preferred and alternative embodiments. Obviously modifications and alterations will suggest themselves to those skilled in the art upon reading and understanding the invention, including the claims hereof. It is intended to include all such modifications and alterations insofar as they come within the scope of the claims hereof.

What is claimed is:

1. A plastic injection molding machine comprising:
   a screw within a barrel and a screw injector mechanism for axially translating said screw within said barrel to inject a shot of melt into a mold;
   a clamp containing a mold separable along a parting line and a clamp mechanism for opening, closing and clamping said mold within said clamp;
   a computerized control system having an object-oriented program for controlling the operation of said clamp and translation of said screw during the molding cycle, said program including i) a clamp class corresponding to said clamp mechanism which, when instantiated, produces a composite clamp object effective to control said clamp and ii) a screw injector class corresponding to said screw injector mechanism which, when instantiated, produces a composite injector object effective to control the injection performed by said screw.

2. The molding machine of claim 1 wherein at least one of the classes is an aggregate class having a plurality of constituent classes.

3. The molding machine of claim 2 wherein each aggregate class is a child of a parent abstract class.

4. The molding machine of claim 2 wherein each aggregate class includes as components thereof a plurality of classes in a multi-level, parent-child hierarchical arrangement.

5. The molding machine of claim 1 wherein said machine further includes rotation hardware for rotating said screw and said control system further includes a rotator class effective to cause rotation of said screw when instantiated as a rotator object.

6. The molding machine of claim 5 wherein at least one of the classes is an aggregate class having a plurality of constituent classes.

7. The molding machine of claim 5 wherein said machine further includes ejector hardware for ejecting a molded part from said mold and said control system further includes an ejector class and an ejector object as an instance of said ejector class effective to cause ejection of said molded part.

8. The molding machine of claim 7 wherein at least one of the classes is an aggregate class having a plurality of constituent classes.

9. The molding machine of claim 7 wherein at least one of said injector, ejector, clamp and rotator classes include,
   a) a controller class which when instantiated forms a controller object receiving instructions from a programmed sequence object and functioning as a state machine;
   b) an observer class in a relationship with sensors on said machine such that when instantiated an observer object determines the current state of said machine; and,
   c) an actuator class in relationship with at least said controller class generating as an instance thereof an actuator object for controlling an actuator associated with the related hardware of said at least one class.

10. The molding machine of claim 9 wherein said controller class is an aggregation of classes including a transition class, a compartment class and a state class, an instance of said state class being a state object indicative of the state of the machine component being controlled by objects of said actuator class, an instance of said transition class being a transition object indicative of an impending change in state of the machine component being controlled by objects of said actuator class and an instance of said compartment class being a compartment object indicative of the various states that the machine component can transition to.

11. The molding machine of claim 9 wherein said actuator class is an aggregation of a number of classes including a move class indicative of the motion of the machine component which is actuated.

12. The molding machine of claim 9 wherein said observer class is an aggregation of a number of classes including a sensor class and a digital filter class, an instance of said sensor class being a read object indicative of the state of a sensor monitoring an observed machine component, an instance of said digital filter class being a digital filter object linked to said read object indicative of the state of current or future motion of the machine component being observed.

13. The molding machine of claim 12 wherein said controller class is an aggregation of classes including a transition class, a compartment class and a state class, an instance of said state class being a state object indicative of the state of the machine component being controlled by objects of said actuator class, an instance of said transition class being a transition object indicative of an impending change in state of the machine component being controlled by objects of said actuator class and an instance of said compartment class being a compartment object indicative of the various states that the machine component can transition to.

14. The molding machine of claim 10 wherein said actuator class is an aggregation of a number of classes including a move class indicative of the motion of the machine component which is actuated.

15. The molding machine of claim 13 wherein said actuator class is an aggregation of a number of classes including a move class indicative of the motion of the machine component which is actuated.

16. A method for controlling the operation of an injection molding machine having a screw axially translatable in a barrel by a screw injector to cause injection of a shot of melt into a mold and a clamp operable to open, close and clamp said mold contained therein by clamp hardware associated with said clamp, said method comprising the steps of:

generating an object oriented, computerized, programmed routine in source code controlling the sequence and implementation of injection and clamping functions of said machine by command signals produced during run time, said object oriented routine including i) a master sequence class defining behavior of said machine through the machine cycle in accordance with a machine control law, ii) a clamp class defining behavior and attributes of said clamp mechanism and owning a plurality of constituent classes and iii) a base screw injector class defining screw attributes and behavior of said screw during injection and owning a plurality of constituent classes;

instantiating said classes when said routine is run to produce from said source code at any instance i) a base clamp object having attributes and defining behavior of said clamp hardware and ii) a screw injector object having attributes and defining behavior of said screw hardware; and, compiling and linking or interpreting or assembling said source code from said base clamp object and said screw inject object into object code processed by the microprocessor in said control system to produce command signals outputted by said system to actuators associated with said screw and said clamp and controlling the behavior thereof.

17. The method of claim 16 wherein said machine has a mechanism for rotating said screw and said program generates command signals controlling rotation of said screw and said method additionally includes the steps of providing an object oriented rotator class defining rotational screw attributes and behavior and instantiating said rotator class to produce from said source code a rotator object controlling rotational behavior of said screw.

18. The method of claim 17 wherein said machine has an eject mechanism for ejecting the molded part from the mold and said program generates command signals controlling the ejection mechanism, said method additionally includes the steps of providing an object oriented ejector class to produce from said source code an ejector object controlling behavior of said ejection mechanism.

19. The method of claim 18 wherein said machine has a die height mechanism for setting the die height of the mold halves in the mold held by said clamp and said program generates command signals controlling said die height mechanism, said method additionally includes the steps of providing a die height class to produce from said source code an object oriented die height object controlling behavior of said die height mechanism.

20. The method of claim 19 wherein at least one of said screw inject, clamp, rotate, eject and die height classes further includes as an aggregation and constituents thereof a controller class, an observer class and an actuator class with said controller class in relationship with at least said actuator class, and said observer class at least in relationship with said actuator class, and instantiating a) said controller class to produce a controller object indicating when a change in state or behavior of the machine element being controlled is to occur; b) said observer class to produce at least one observer object indicative of the current state or behavior of the machine element being controlled by the object of said at least one of said classes; and, c) said actuator class to produce at least one actuator object indicative of the command signal regulating the state or behavior of the machine component being controlled by said at least one of said classes.

21. The method of claim 20 wherein said controller object changes state prior to the time said state change is to occur on the machine hardware regulated by said controller.

22. In a plastic injection molding machine having hardware and associated actuators permitting said machine to mold parts in a sequenced cycle including clamp, inject, hold, recover and eject and having a microprocessor control system controlling the operation of said actuators to produce a molding cycle meeting set points established by an operator of said machine, said microprocessor control system including at least one controller regulating specific machine hardware to meet the set points for a sequence in the cycle, the improvement comprising:

said controller being programmed as an object-oriented programmed sequence having a controller class instantiated as a controller object with behavior transitioning from at least a first state to a second state in advance of the time a state transition is to occur and said controller class having attributes related to the hardware and machine actuator controlled by said controller.

23. The machine of claim 22 wherein said controller object is an aggregated object owning a plurality of constituent objects, each constituent object having behavior for preparing the transition of said controller object from one state to the other in advance of the time at which said transition occurs.

24. The machine of claim 23 wherein said object oriented program sequence further includes an observer class in relationship to at least said actuator class and instantiated to produce an observer object indicative of the behavior of the machine hardware and its associated actuator(s).

25. In a plastic injection molding machine having hardware and associated actuators permitting said machine to mold parts in a sequenced cycle including clamp, inject, hold, recover and eject and having a microprocessor control system controlling the operation of said actuators to produce a molding cycle meeting set points established by an operator of said machine, said microprocessor control system including at least one controller regulating specific machine hardware to meet the set points for a sequence in the cycle, the improvement comprising:
   said controller being programmed as an object-oriented programmed sequence having a controller class instantiated as a controller object with behavior transitioning from at least a first state to a second state in advance of the time a state transition is to occur and said controller class having attributes related to the hardware and machine actuator controlled by said controller, wherein said controller object is an aggregated object owning a plurality of constituent objects, each constituent object having behavior for preparing the transition of said controller object from one state to the other in advance of the time at which said transition occurs, said object oriented program sequence further includes an actuator class in relationship to said controller class and instantiated to produce an actuator object controlling the behavior of said actuator regulated by said controller in accordance with state instructions from said controller object, said object oriented program sequence further includes an observer class in relationship to at least said actuator class and instantiated to produce an observer object indicative of the behavior of the machine hardware and its associated actuator(s), said observer class and said actuator classes are aggregations of a plurality of constituent classes, one of said constituent classes of said observer class including a digital filter class for producing, as an instance thereof, a digital filter object indicative of the current motion of the hardware being controlled by said controller.

26. A method for controlling molding of parts by an injection molding machine having hardware performing a sequence of clamp, inject, hold, recover and eject through a computerized control system having an operator station setting set points for the sequence and including at least one controller generating control signals for regulating performance of machine hardware through a machine actuator(s) for performing at least one of said sequences pursuant to sequence instructions received from said control system, said method comprising the steps of:
   generating i) an object-oriented controller class having behavioral characteristics of said machine hardware performing one of said controlled sequences, said behavior characteristics including transitioning said controller from a first state to a second state and ii) an object oriented actuator class in relationship with said controller class and having behavioral characteristics indicative of move instructions for said machine actuator to implement for controlling said machine hardware performing one of said controlled sequences;
   instantiating said controller class to produce a controller object and said actuator class to produce an actuator object, said controller object sending messages to said actuator object and said actuator object containing source code for generating move commands to its associated machine actuator(s); and,
   compiling and linking or assembling or interpreting said source code to produce object code acted upon by said microprocessor to produce command signals for controlling said machine actuator(s) of said machine hardware performing one of said controlled sequences.

27. The method of claim 26 wherein said generating step produces an aggregate controller class owning component classes having behavior that prepares said controller class to ready a transition from one state to another in advance of the actual time said transition is to occur.

28. The method of claim 26 further including the step of generating an observer class with behavior producing as an observer object a triggering signal indicative of the current state of the machine hardware being controlled by said controller object.

29. The method of claim 28 wherein said observer class is an aggregate observer class owning a plurality of constituent classes, one of said constituent observer classes including a digital filter class producing when said source code is run a digital filter object indicative of the current motion of the machine hardware being regulated by said controller class.

30. A modeling method for assembling source code into an object oriented programmed routine for controlling any specific injection molding machine having hardware actuators controlling hardware machine components performing an interrelated machine molding cycle of close, inject, hold, recover and eject pursuant to a general, sequence control law common to all injection molding machines, said method comprising the steps of:
   a) building an object oriented class library collection by modeling as general classes therein a class corresponding to attributes and behavior of major machine components necessary to perform each step of said molding cycle including at least the general, abstract classes of a clamp class, an inject class, a rotate class and an eject class and relations therebetween; specifying for each general class a plurality of more specific child classes, each child class inheriting the attributes and behavior of its parent class and adding thereto additional attributes and behavior more specific to different hardware components used in injection molding machines for performing the function controlled by said general abstract class and optionally specifying additional descendants until all different types of molding machine hardware performing the behavior of the realizable descendants have been modeled, principally by difference;
   b) building a component library including i) a collection of primitive components corresponding to the assembled classes including usage relations, associations and aggregations for the realizable and selective abstract classes, ii) a subsystem collection of related primitive components is specified and iii) a machine variant component in which desired subsystems for a specific machine and making up the control system for a desired machine are selected; and, c) adding additional objects of classes depending from classes in said subsystem for any specific machine, principally by difference, to account for any specific requirements of the specific machine not accounted for in the subsystem collection whereby any injection molding machine using existing hardware components can be programmed to produce a molding machine cycle.

31. The modeling method of claim 26 further including the step of identifying a specific machine variant with its source code and storing the information in a machine project file for future use.

32. The modeling method of claim 27 wherein said additional classes added to said variant are related to the size of a desired machine if a subsystem for such machine size does not exist and includes limits of shot size, injection stroke and related matter used to program classes, by difference, whose behavioral function is affected by such parameters.

* * * * *